(12) United States Patent
Yamamoto et al.

(10) Patent No.: US 8,320,696 B2
(45) Date of Patent: Nov. 27, 2012

(54) IMAGE PROCESSING APPARATUS, IMAGE PROCESSING METHOD, AND PROGRAM

(75) Inventors: Takahisa Yamamoto, Kawasaki (JP); Masami Kato, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1060 days.

(21) Appl. No.: 12/241,864

(22) Filed: Sep. 30, 2008

(65) Prior Publication Data

US 2009/0087118 A1 Apr. 2, 2009

(30) Foreign Application Priority Data

Oct. 2, 2007 (JP) ................................ 2007-259060

(51) Int. Cl.
*G06K 9/40* (2006.01)
(52) U.S. Cl. ........ 382/260; 382/253; 382/254; 382/266; 382/166; 382/232; 382/246; 382/300; 382/199
(58) Field of Classification Search .................. 382/260, 382/253, 254, 266, 166, 232, 246, 300, 199
See application file for complete search history.

(56) References Cited

U.S. PATENT DOCUMENTS

| 5,191,547 | A  | * | 3/1993  | Kawamoto et al. ........... 708/313 |
| 6,188,803 | B1 | * | 2/2001  | Iwase et al. .................... 382/300 |
| 7,432,985 | B2 |   | 10/2008 | Ishikawa et al. .............. 348/616 |
| 2008/0002766 | A1 |   | 1/2008 | Suwa et al. ................. 375/240.12 |
| 2008/0114821 | A1 | * | 5/2008 | Masumoto ..................... 708/313 |
| 2008/0123150 | A1 |   | 5/2008 | Ono et al. ..................... 358/3.27 |
| 2008/0123153 | A1 |   | 5/2008 | Yamada et al. .............. 358/3.27 |

FOREIGN PATENT DOCUMENTS

JP 2004-013873 1/2004

* cited by examiner

*Primary Examiner* — Mike Rahmjoo
(74) *Attorney, Agent, or Firm* — Fitzpatrick, Cella, Harper & Scinto

(57) ABSTRACT

In order to reduce wasteful operation processes by operation units, a data supply unit reads out a plurality of pieces of pixel data from an image memory and temporarily stores the pixel data in registers, and outputs the pixel data while shifting the pixel data in one direction; product-sum operators concurrently perform operation processes based on multiple pieces of pixel data outputted from the data supply unit and filter coefficients in a filter kernel. At this time, a selector within the data supply unit selects the pixel data stored in each register in accordance with the type of the filter operation process, and outputs the selected pixel data to the product-sum operators.

7 Claims, 14 Drawing Sheets

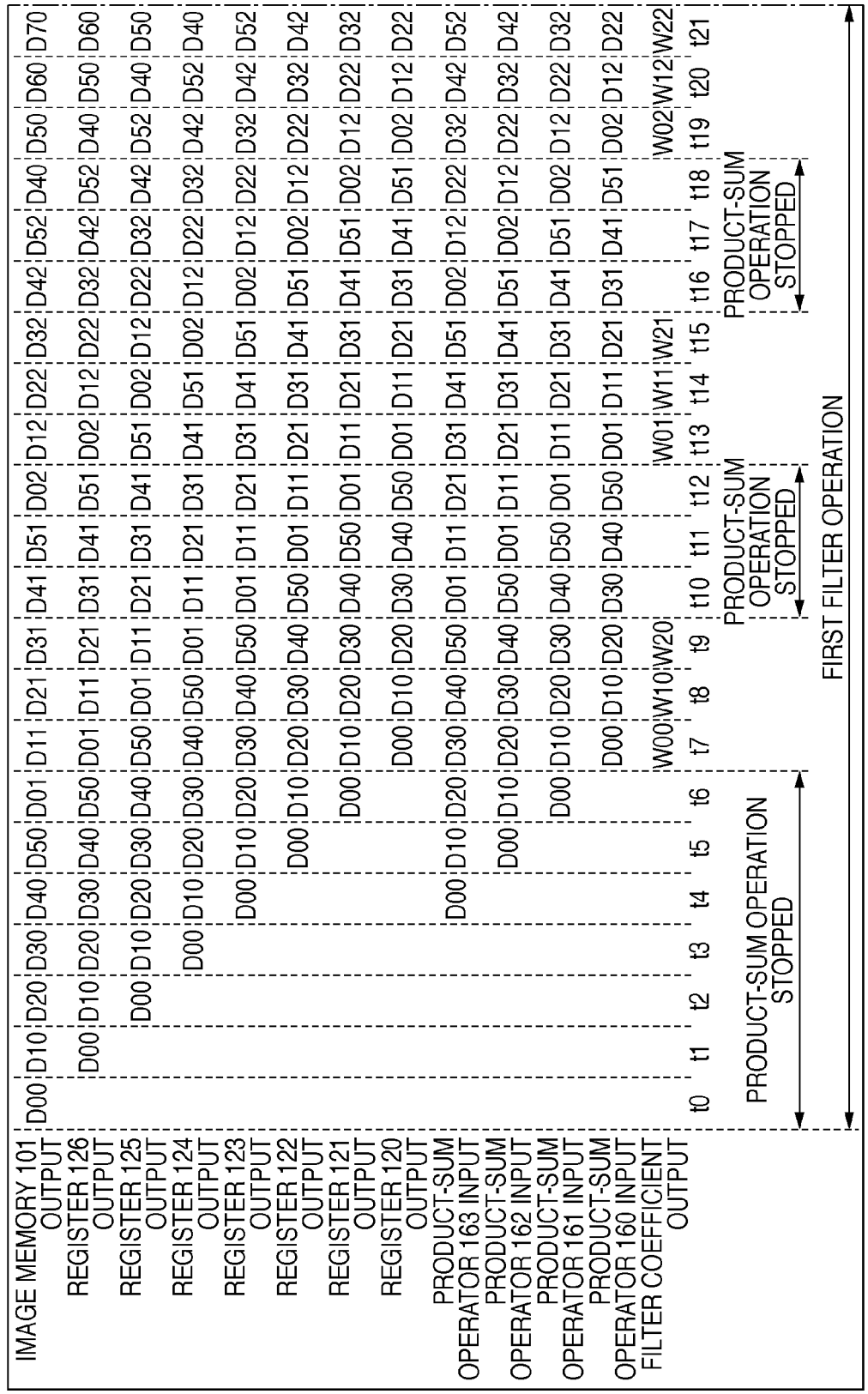

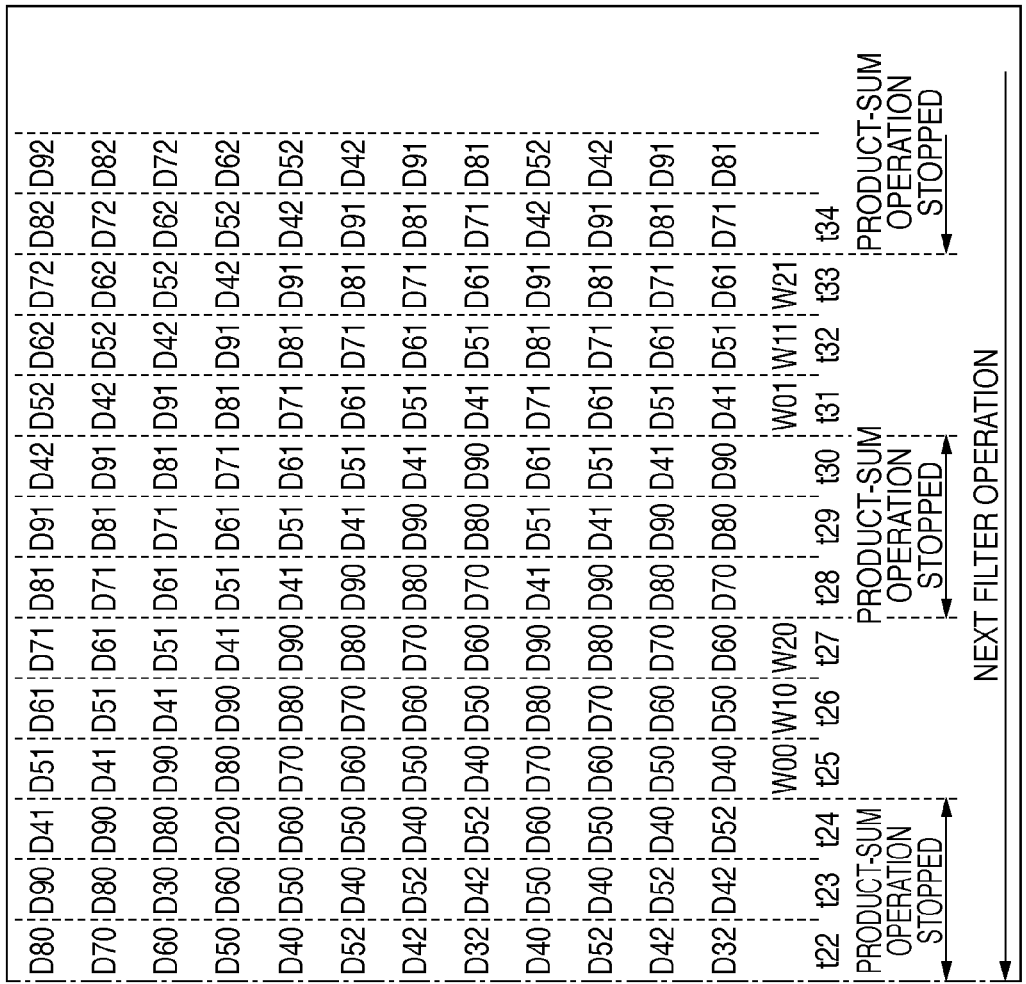

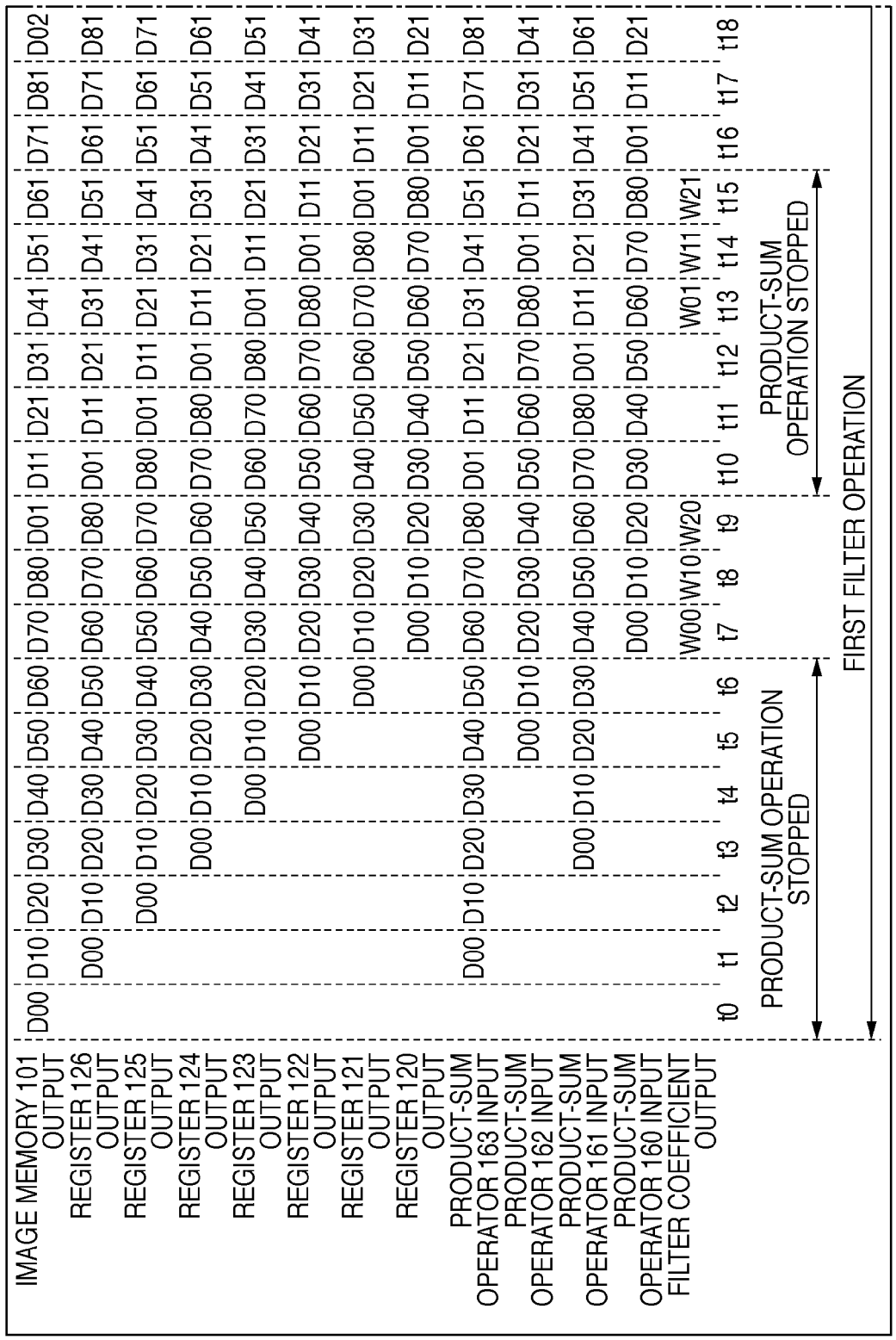

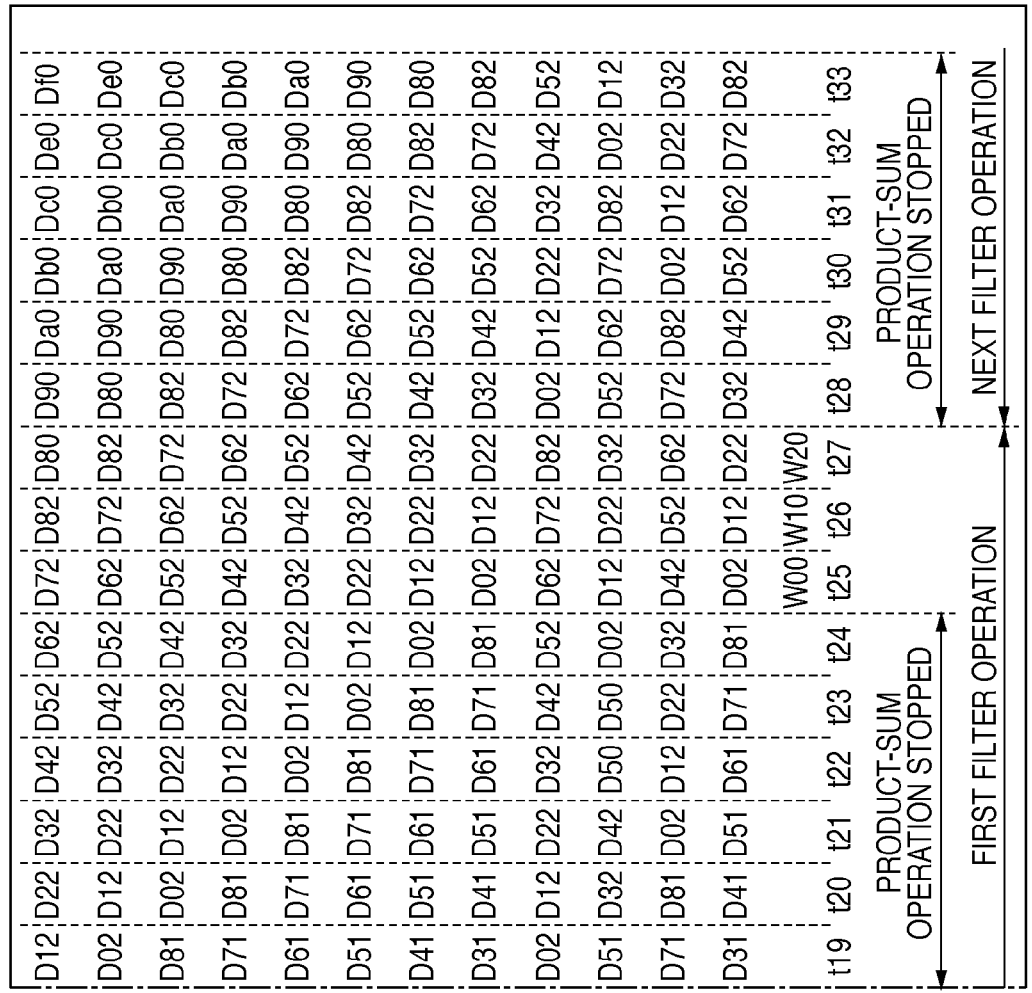

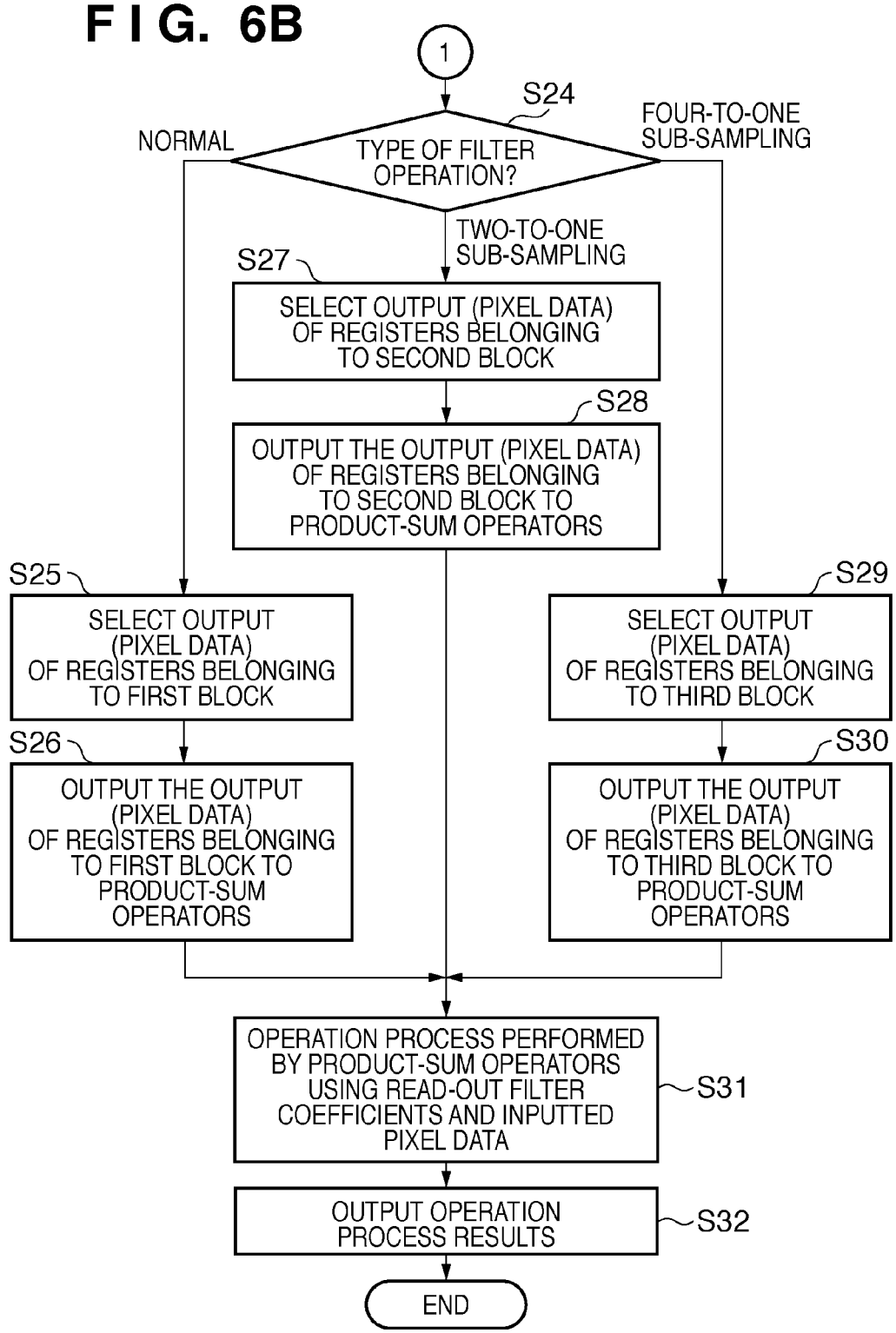

FIG. 11
PRIOR ART $$R(x)(y) = \sum_{i,j=-1,-1}^{1,1} D(x+i)(y+j) \times W(i+1)(j+1)$$

| R11 | R31 | R51 | R71 | ... |
|-----|-----|-----|-----|-----|
| R13 | R33 | R53 | R73 | ... |
| R15 | R35 | R55 | R75 | ... |
| R17 | R37 | R57 | R77 | ... |
| ⋮ | ⋮ | ⋮ | ⋮ | ... |

(TWO-TO-ONE SUB-SAMPLING FILTER OPERATION OUTPUT IMAGE)

IMAGE PROCESSING APPARATUS, IMAGE PROCESSING METHOD, AND PROGRAM

BACKGROUND OF THE INVENTION

1. Field of the Invention

The present invention relates to an image processing apparatus and image processing method that performs a filter operation process on pixel data of an image stored in an image memory by scanning the pixel data using a filter kernel, and relates to a program for causing a computer to execute the image processing method.

2. Description of the Related Art

Conventionally, pixel arrays are two-dimensional, particularly in the field of image processing, and therefore two-dimensional data operations, such as two-dimensional filter processes are performed frequently. With respect to such computations, in Japanese Patent Laid-Open No. 2004-13873 (Patent Document 1), multiple operators, such as product-sum operators, are prepared, and pixel data of an operation target image (image on which an operation is to be performed) supplied to the operators is shared and concurrently processed among the multiple operators. This is done in an attempt to achieve high-speed operation processing and efficient use of the image data of the operation target image.

Patent Document 1 uses an operation apparatus (image processing apparatus) configured as shown in, for example, FIG. 8.

FIG. 8 is a block diagram illustrating an example of the configuration of an operation apparatus (image processing apparatus) that performs a two-dimensional filter operation on image data, as indicated in the conventional example. The operation apparatus shown in FIG. 8 can concurrently perform filter operation processes on multiple pixels (in FIG. 8, 4 pixels) of an output image.

The operation apparatus (image processing apparatus) shown in FIG. 8 is configured of a memory 500 that holds pixel data of an operation target image, a shift register 501 capable of parallel input/parallel output, and product-sum operators 560 to 563.

The product-sum operators 560 to 563 are configured of multipliers 530 to 533, adders 540 to 543, and registers 550 to 553. The registers 550 to 553 respectively store the results of the product-sum operations produced using the multipliers 530 to 533 and adders 540 to 543.

The shift register 501 is configured of selectors 510 to 515 that select whether to load data in parallel or shift the data, and registers 520 to 525.

FIG. 9 is a schematic diagram illustrating an input image (operation target image), a filter kernel, and an operation output image (image resulting from the operation) in the case where filter operation processing is performed using the operation apparatus shown in FIG. 8. To be more specific, 901 indicates the input image (operation target image), 902 indicates the filter kernel, and 903 indicates the operation output image (image resulting from the operation). Meanwhile, FIG. 10 is a time chart for when the operation apparatus of FIG. 8 is run using the images and so on illustrated in FIG. 9.

Operations performed by the conventional image processing apparatus shall be described using FIGS. 8, 9, and 10.

First, at time t0 in FIG. 10, pixel data D00, D10, and so on up to D50, of the operation target image within the input image 901, are read out from the memory 500. At this time, the selectors 510 to 515 select the inputs from the memory 500 and output these inputs to the registers 520 to 525, respectively.

Next, at time t1 in FIG. 10, the pixel data D00, D10, and so on up to D50 outputted by the selectors 510 to 515 are loaded into the registers 520 to 525, respectively, and at the same time, the pixel data D00, D10, D20, and D30 are outputted to the product-sum operators 560 to 563. Simultaneously, a filter coefficient W00 in the filter kernel 902 is outputted to the product-sum operators 560 to 563, and the product-sum operation is performed thereby. At this time, the outputs of the selectors are switched so as to select the outputs of the previous registers.

Next, at time t2 in FIG. 10, the pixel data D10, and so on up to D50 outputted by the selectors 510 to 514 are shifted to the registers 520 to 524, respectively, and at the same time, the pixel data D10, D20, D30, and D40 are outputted to the product-sum operators 560 to 563. Simultaneously, a filter coefficient W10 in the filter kernel 902 is outputted to the product-sum operators 560 to 563, and the product-sum operation is performed thereby along with the results obtained thus far (the results held in the registers 550 to 553). At this time, the outputs of the selectors do not change, with the output of the previous registers being selected.

Next, at time t3 in FIG. 10, the pixel data D20 and so on up to D50 outputted by the selectors 510 to 513 are shifted to the registers 520 to 523, respectively, and at the same time, the pixel data D20, D30, D40, and D50 are outputted to the product-sum operators 560 to 563. Simultaneously, a filter coefficient W20 in the filter kernel 902 is outputted to the product-sum operators 560 to 563, and the product-sum operation is performed thereby along with the results obtained thus far (the results held in the registers 550 to 553). At this time, the outputs of the selectors are switched so as to select the input from the memory 500.

By repeating these operations, filter operation results R11 to R41 are stored in the registers 550 to 553 at time t10. Furthermore, by repeating these operations while causing the filter kernel to scan the operation target image, it is possible to perform the filter operation process across the entire surface of the input image.

However, in Patent Document 1, the operation output images are outputted concurrently, and thus there is a problem that a decimating filter operation process (sub-sampling filter operation process) cannot be carried out effectively.

The "decimating filter operation process" ("sub-sampling filter operation process") refers to an operation process that decimates the operation output image rather than decimating the operation target image and then performing a filter operation process. In normal filter operation processes, the operation output image is obtained by performing the filter operation process while shifting the filter kernel one pixel at a time with respect to the operation target image. As opposed to this, in the sub-sampling filter operation process, the operation output image is obtained by performing the filter operation process while shifting the filter kernel multiple pixels (for example, two pixels) at a time.

For example, a sub-sampling filter operation process that shifts the filter kernel by two pixels at a time (called a "two-to-one sub-sampling filter operation process" here) has a computational amount ¼ of that of a normal filter operation process, making high-speed operations possible.

For example, when a two-to-one sub-sampling filter operation process is performed on the operation target image illustrated in the input image 901, the operation output image illustrated in FIG. 11 is obtained (the vertical/horizontal size of the operation output image is approximately half that of the operation target image).

However, if this sub-sampling filter operation process is performed using the apparatus of Patent Document 1, four pixels in the horizontal direction of the operation output image are outputted concurrently (for example, R11, R21, R31, and R41 are outputted simultaneously), and therefore the output results are decimated. Therefore, the technique of Patent Document 1 cannot effectively reduce the computational amount (of course, the computational amount can be reduced in the vertical direction, which means that the computational is ½ that of a normal filer operation process). In this case, the results of the operations performed by the product-sum operators 561 and 563 (R21 and R41) are ultimately decimated, and are thus wasted.

In other words, even if the normal filter operation process is replaced with a sub-sampling filter operation process in order to reduce the computational amount of the filter operation process, as with the conventional technique, there is a problem that only a disappointingly low reduction in the computational amount can be obtained. This problem means that, for example, even if a two-to-one sub-sampling filter operation process is performed with the goal of reducing the computational amount to ¼, the actual computational amount can only be reduced to ½.

SUMMARY OF THE INVENTION

According to one aspect of the present invention, an image processing apparatus that performs a filter operation process on pixel data of an image stored in an image memory by scanning the pixel data using a filter kernel, the apparatus comprises: a data supply unit that reads out a plurality of pieces of pixel data from the image memory and temporarily stores the pixel data in a plurality of memory units, and outputs the stored plurality of pieces of pixel data while sequentially shifting the pixel data; a plurality of operation units that concurrently perform filter operation processes based on filter coefficients in the filter kernel and the plurality of pieces of pixel data outputted from the data supply unit; and a selection unit that selects one of the plurality of memory units for at least one specific operation unit in the plurality of operation units in accordance with the type of the filter operation process and outputs the pixel data stored in the selected memory unit to the specific operation unit.

According to another aspect of the present invention, an image processing method that performs a filter operation process on pixel data of an image stored in an image memory by scanning the pixel data using a filter kernel, the method comprises: a data supply step of reading out a plurality of pieces of pixel data from the image memory and temporarily storing the pixel data in a plurality of memory units, and outputting the stored plurality of pieces of pixel data while sequentially shifting the pixel data; and an operation step of concurrently performing filter operation processes based on filter coefficients in the filter kernel and a plurality of pieces of pixel data outputted in the data supply step using a plurality of operation units, wherein the data supply step includes a selection step of selecting one of the plurality of memory units for at least one specific operation unit in the plurality of operation units in accordance with the type of the filter operation process and outputs the pixel data stored in the selected memory unit to the specific operation unit.

According to still another aspect of the present invention, a program stored in a computer-readable storage medium for causing a computer to execute an image processing method that performs a filter operation process on pixel data of an image stored in an image memory by scanning the pixel data using a filter kernel, the program causing a computer to execute: a data supply step of reading out a plurality of pieces of pixel data from the image memory and temporarily storing the pixel data in a plurality of memory units, and outputting the stored plurality of pieces of pixel data while sequentially shifting the pixel data; and an operation step of concurrently performing filter operation processes based on filter coefficients in the filter kernel and a plurality of pieces of pixel data outputted in the data supply step using a plurality of operation units, wherein the data supply step includes a selection step of selecting one of the plurality of memory units for at least one specific operation unit in the plurality of operation units in accordance with the type of the filter operation process and outputs the pixel data stored in the selected memory unit to the specific operation unit.

According to the present invention, the needless execution of operation processes in an operation apparatus can be reduced.

Further features of the present invention will become apparent from the following description of an exemplary embodiment (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are time charts illustrating an example of operations performed when the image processing apparatus according to the first embodiment of the present invention carries out a normal filter operation process.

FIGS. 3A and 3B are time charts illustrating an example of operations performed when the image processing apparatus according to the first embodiment of the present invention carries out a sub-sampling filter operation process.

FIGS. 6A and 6B are flowcharts illustrating an example of a processing procedure of the image processing apparatus according to the second embodiment of the present invention.

FIG. 11 is a schematic diagram illustrating an example of a two-to-one sub-sampling filter operation output image as indicated in the conventional example.

DESCRIPTION OF THE EMBODIMENTS

Embodiments of the present invention shall be described hereinafter.

(First Embodiment)

A first embodiment of the present invention shall be described hereinafter.

Figure 1:
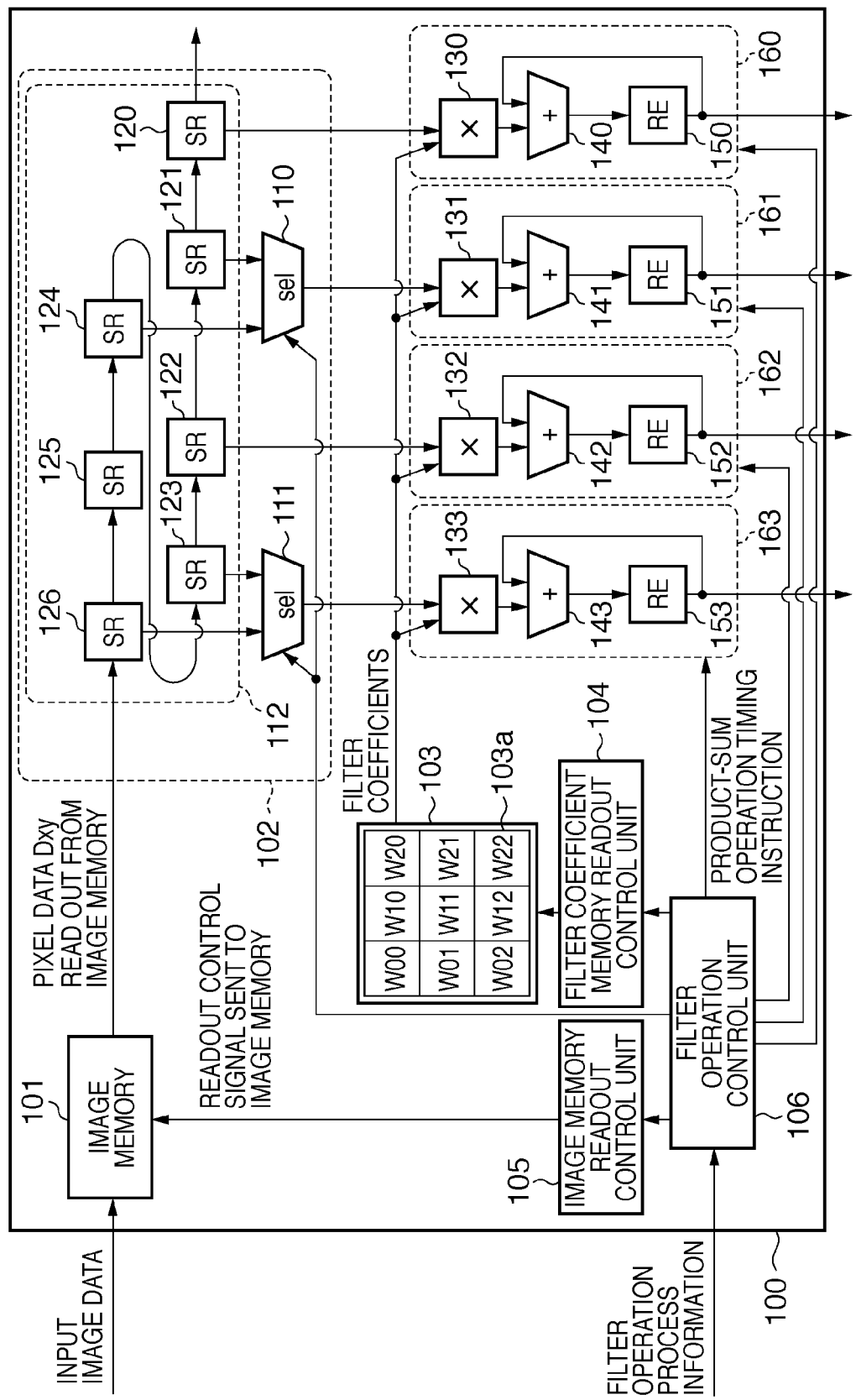
FIG. 1 is a block diagram illustrating an outline of an exemplary configuration of an image processing apparatus according to a first embodiment of the present invention.

FIG. 1 is a block diagram illustrating an outline of an exemplary configuration of an image processing apparatus according to the first embodiment of the present invention.

An image processing apparatus 100 according to the present embodiment is configured so as to obtain four pixels' worth of an operation output image concurrently by using four product-sum operators (160 to 163), which shall be mentioned later. Here, the number of pixels of the operation output image obtained concurrently shall be called the "concurrency level". In the present embodiment, the concurrency level is 4.

The image processing apparatus 100 according to the present embodiment is configured to be capable of performing both a normal filter operation process and a two-to-one sub-sampling filter operation process. Meanwhile, the ratio at which sub-sampling is performed (that is, a value indicating how many pixels are to be shifted at a time when performing the filter operation process on the operation target image) shall be called the "sub-sampling ratio". In the present embodiment, a sub-sampling ratio of 2 is taken as an example. If a normal filter operation process is thought of as a "one-to-one" sub-sampling filter operation process, the image processing apparatus 100 of the present embodiment is capable of performing a filter operation process with sub-sampling ratios of both 1 and 2.

The image processing apparatus 100 is configured of an image memory 101, a data supply unit 102, a filter coefficient memory 103, a filter coefficient memory readout control unit 104, an image memory readout control unit 105, a filter operation control unit 106, and product-sum operators 160 to 163.

The image processing apparatus 100 of the present embodiment performs a filter operation process on pixel data of an image stored in the image memory 101 by scanning the pixel data using a filter kernel (103a).

The image memory 101 is a memory that stores an operation target image inputted from an external device.

The filter coefficient memory 103 is a memory that stores the filter kernel 103 a, which in turn is provided with multiple filter coefficients. The filter coefficients of the filter kernel 103a are sequentially outputted from the filter coefficient memory 103.

The product-sum operators 160 to 163 are configured of multipliers 130 to 133, adders 140 to 143, and registers 150 to 153, respectively. The product-sum operators 160 to 163 concurrently perform operation processes using multiple pieces of pixel data outputted (supplied) by the data supply unit 102 and the filter coefficients in the filter kernel 103a. To be more specific, the product-sum operators 160 to 163 concurrently perform processes that accumulate and add the results of multiplying the pixel data belonging to an operation target image supplied by the data supply unit 102 with the filter coefficients. In the following descriptions, for the sake of simplicity, the product-sum operator 160 is assumed to be the first product-sum operator, and the order of the product-sum operator is 160, 161, 162, and 163.

The multipliers 130 to 133 multiply the output of the data supply unit 102 with the filter coefficients inputted by the filter coefficient memory 103, and output the products obtained thereby. The adders 140 to 143 add the output from the multipliers 130 to 133 to the respective data in the registers 150 to 153. The registers 150 to 153 each accumulate the output data from the adders 140 to 143.

The data supply unit 102 is configured so as to include a shift register 112 (configured of registers 120 to 126) capable of parallel output, and selectors 110 and 111. The data supply unit 102 temporarily stores multiple pieces of pixel data outputted by the image memory 101, as well as outputting that pixel data while sequentially shifting it in one direction (in the present embodiment, the horizontal direction). To be more specific, the data supply unit 102 accumulates pixel data Dxy, inputted from the image memory 101, of an amount equal to the number of registers included (in the present embodiment, seven pixels' worth), and outputs these in parallel to the product-sum operators 160 to 163. Therefore, the width in bits of the shift register 112 (that is, the width in bits of the registers 120 to 126 that make up the shift register 112) is at least the same as the width in bits of the pixel data Dxy of the operation target image (input image).

In FIG. 1, the outputs of the registers 120 to 126 that temporarily store multiple pieces of pixel data read out from the image memory 101 are connected so as to fulfill one of the following 1 through 3:

1. Not inputted into a product-sum operator (for example, the register 125)
2. Directly inputted into a product-sum operator (for example, the register 120)
3. Inputted into a product-sum operator via a selector (for example, register 121)

These forms of connection are determined based on the rules indicated hereinafter.

First, the registers 120 to 126 are configured to belong to one or more of multiple blocks, in accordance with the "classification of registers by blocks" described below. There are also registers that are not classified into any blocks. As shall be made clear in the "classification of registers by blocks" described below, the number of blocks is equal to the number of types of sub-sampling ratios. In the present embodiment, there are two types of sub-sampling ratios, or 1 and 2, and thus the number of blocks is also 2 (for the sake of simplicity, these shall be called a "first block" and a "second block").

(Classification of Registers by Blocks) The first registers of a number equal to the concurrency level (4, in the present embodiment), present for each sub-sampling ratio from the first register 120 in the shift register 112, belong to the first block. To be more specific, in the present embodiment, four registers, or 120, 121, 122, and 123, belong to the first block.

The first registers of a number equal to the concurrency level (4, in the present embodiment), present for every other sub-sampling ratio from the first register 120 in the shift register 112, belong to the second block. To be more specific, in the present embodiment, four registers, or 120, 122, 124, and 126, belong to the second block.

The difference between a normal filter operation process and a sub-sampling filter operation process is whether the operation output image is obtained by performing a filter operation process while shifting the filter kernel 103a one pixel at a time or the operation output image is obtained by performing a filter operation process while shifting the filter kernel 103a multiple pixels (for example, two pixels) at a time.

Therefore, a "register belonging to the first block" as mentioned above refers to a register to which the pixel data necessary when performing a filter operation process while shifting the filter kernel 103 a one pixel at a time is supplied. Likewise, a "register belonging to the second block" as mentioned above refers to a register to which the pixel data necessary when performing a filter operation process while shifting the filter kernel 103 a two pixels at a time is supplied.

In other words, the registers 120 to 126 are classified into multiple blocks according to the type of the filter operation process.

The image processing apparatus 100 of the present embodiment selects, using the selectors 110 and 111, the output of the registers belonging to one of the blocks to input into the product-sum operators 160 to 163. In this manner, the image processing apparatus 100 according to the present embodiment is capable of performing both a normal filter operation process and a sub-sampling filter operation process using a single circuit configuration.

Table 1, below, shows the result of applying the "classification of registers by blocks" to the registers 120 to 126.

TABLE 1

|  | Register 120 | Register 121 | Register 122 | Register 123 | Register 124 | Register 125 | Register 126 |
|---|---|---|---|---|---|---|---|
| Classification Results | Belongs to first and second blocks | Belongs to first block | Belongs to first and second blocks | Belongs to first block | Belongs to second block | — | Belongs to second block |

Here, it is necessary to combine the choices of an output belonging to the first block and the output of a register belonging to the second block and determine to which product-sum operator the results of the selection are to be inputted. To be more specific, any combination of outputs of registers belonging to the first and second blocks, respectively, may be used, and the results of the selection may be inputted to any product-sum operator. However, the present embodiment aims to reduce the number of selectors as much as possible, and such a case shall be described below.

Because the selectors are used to select the output of a register belonging to the first block or the output of a register belonging to a second block, in order to reduce the number of selectors, the configuration is first made so that the outputs of the registers 120 and 122 that belong to both blocks are not used. Of course, the output of the register 125, which does not belong to either block, is not inputted into the product-sum operators 160 to 163.

As mentioned above, the present embodiment makes a priority of not using the selectors for the outputs of the registers 120 and 122 that belong to both blocks. Furthermore, into which product-sum operator the combination of choices and the selection results thereof are to be inputted is determined so that the order of output of the filter operation results from the product-sum operators 160 to 163 so as to be as similar as possible between the normal filter operation process and the sub-sampling filter operation process.

To be more specific, in the present embodiment, the registers 120 to 126 are associated with one of the product-sum operators 160 to 163 or with another product-sum operator, in accordance with the "first association of registers and product-sum operators" described below.

(First Association of Registers and Product-Sum Operators)

The first registers of a number equal to the concurrency level (4, in the present embodiment) in the shift register 112 are associated, in order starting with the first register 120 (120, 121, 122, and 123), with the product-sum operators in order (160, 161, 162, and 163).

The next registers of a number equal to the concurrency level (4, in the present embodiment) are associated with the product-sum operators whose order has been shifted one place to the rear. In other words, the next registers are associated, in order (124, 125, and 126), with the product-sum operators whose order has been shifted one place to the rear (161, 162, and 163). Note that if there is no product-sum operator when the order has been shifted one place to the rear, no operator is considered to be present.

By carrying out association in this manner, when multiple registers are to be associated with a single product-sum operator, the outputs of each register are connected to selectors, and the results of the selection are inputted into the product-sum operator. However, in the abovementioned "classification of registers by blocks", the output of the register 125, which has not been classified as belonging to any block, does not need to be inputted into the product-sum operators 160 to 163, and thus the register 125 can be excluded from connection.

Table 2, below, shows the result of performing the "first association of registers and product-sum operators" on the registers 120 to 126 while furthermore excluding the register 125, which is not classified into any block.

TABLE 2

|  | Product-sum Operator 160 | Product-sum Operator 161 | Product-sum Operator 162 | Product-sum Operator 163 |
|---|---|---|---|---|
| Association Results | Register 120 | Register 121 Register 124 | Register 122 | Register 123 Register 126 |

The forms of connection of the outputs of the registers 120 to 126 are determined as shown below based on Table 2.

1. If there is only a single register that corresponds to a product-sum operator, the output of that register is connected directly to that corresponding product-sum operator (i.e. the registers 120 and 122).

2. If there are multiple registers corresponding to a product-sum operator, the outputs of those registers are connected to the corresponding product-sum operator via selectors (registers 121, 124, 123, and 126).

Based on these rules, the forms of connection between the registers 120 to 126 and the product-sum operators 160 to 163 are determined (see FIG. 1). To be more specific, the output of the register 121 belonging to the first block and the output of the register 124 belonging to the second block are inputted into the selector 110 and the output selected by the selector 110 is inputted into the product-sum operator 161. Furthermore, the output of the register 123 belonging to the first block and the output of the register 126 belonging to the second block are inputted into the selector 111 and the output selected by the selector 111 is inputted into the product-sum operator 163.

The filter coefficient memory readout control unit 104 performs control for sequentially reading out filter coefficients from the filter kernel 103a of the filter coefficient memory 103 and into the multipliers 130 to 133 according to a predetermined order (for example, in the present embodiment, in the horizontal scanning order).

The image memory readout control unit 105 performs control for sequentially reading out pixel data from the image memory 101 and into the shift register 112 according to a predetermined order (for example, in the present embodiment, in the horizontal scanning order).

The filter operation control unit 106 performs overall control of the processing involved with the filter operations based on filter operation process information provided according to the type of the filter operation process inputted by, for example, and external operation input unit. Here, in the present embodiment, the normal filter operation process and the two-to-one sub-sampling filter operation process are given as the types of the filter operation process, and these can also be specifically thought of as types stipulating the number of pixels shifted during the filter operation process.

In the present embodiment, the filter operation control unit 106 controls the filter coefficient memory readout control unit 104, the image memory readout control unit 105, the selectors 110 and 111, and the product-sum operators 160 to 163 based on the filter operation process information. To be more specific, the following control is performed.

First, the filter operation control unit 106 outputs control signals as described below to the selectors 110 and 111.

1. In the case where a normal filter operation (a filter operation with a sub-sampling ratio of 1) is carried out, a control signal is outputted so that the outputs of the registers belonging to the first block (registers 121 and 123) are selected as the outputs of the selectors 110 and 111.

2. In the case where a two-to-one sub-sampling filter operation (a filter operation with a sub-sampling ratio of 2) is carried out, a control signal is outputted so that the outputs of the registers belonging to the second block (registers 124 and 126) are selected as the outputs of the selectors 110 and 111.

In other words, the selectors 110 and 111 select one of the multiple registers 120 to 126 for at least one specific product-sum operator from the multiple product-sum operators 160 to 163 in accordance with the type of the filter operation process indicated in the filter operation process information. The selectors 110 and 111 then output the pixel data stored in the selected registers to the specific product-sum operator. To be more specific, the selectors 110 and 111 select the pixel data in the registers belonging to a single block from registers classified into multiple blocks in accordance with the type of filter operation information indicated in the filter operation process, and output the pixel data to the product-sum operator.

The filter operation control unit 106 also outputs control signals as described below to the image memory readout control unit 105.

1. In the case where a normal filter operation (a filter operation with a sub-sampling ratio of 1) is carried out, a control signal for reading out a number of operation target pixels equivalent to "concurrency level+horizontal size of filter kernel−1" from the image memory 101 in the horizontal direction and once again reading out a number of operation target pixels equivalent to "concurrency level+horizontal size of filter kernel−1" from the next row, and repeating these readouts a number of times equivalent to the size of the vertical direction of the filter kernel, is outputted to the image memory readout control unit 105. In the present embodiment, 6, or 4+3−1, operation target pixels in the horizontal direction are read out, and the readout is repeated three times.

2. In the case where a two-to-one filter operation (a filter operation with a sub-sampling ratio of 2) is carried out, a control signal for reading out a number of operation target pixels equivalent to "2× concurrency level+horizontal size of filter kernel−2" from the image memory 101 in the horizontal direction and once again reading out a number of operation target pixels equivalent to "2×concurrency level+horizontal size of filter kernel−2" from the next row, and repeating these readouts a number of times equivalent to the size of the vertical direction of the filter kernel, is outputted to the image memory readout control unit 105. In the present embodiment, 9, or 2×4+3−2, operation target pixels in the horizontal direction are read out, and the readout is repeated three times.

Furthermore, the filter operation control unit 106 instructs the filter coefficient memory 103 of the readout timing via the filter coefficient memory readout control unit 104, and instructs the product-sum operators 160 to 163 of the product-sum operation timing.

Next, operations performed when the image processing apparatus 100 illustrated in FIG. 1 carries out a normal filter operation process and a sub-sampling filter operation process shall be described.

First, operations performed when a normal filter operation process is carried out shall be described.

FIGS. 2A and 2B are time charts illustrating an example of operations performed when the image processing apparatus according to the first embodiment of the present invention carries out a normal filter operation process.

First, the filter operation control unit 106 outputs a control signal to the selectors 110 and 111 so that the outputs of the registers belonging to the first block (registers 121 and 123) are selected.

Next, the filter operation control unit 106 instructs the image memory readout control unit 105 to read out, from the image memory 101, six operation target pixels, or D00, D10, and so on up to D50, in the horizontal direction, and to supply those pixels to the shift register 112. Specifically, this process is carried out from time t0 to t5.

Then, the shift register 112 sequentially shifts the pixel data of the operation target pixels inputted from the image memory 101 and at the same time outputs the pixel data to the product-sum operators 160 to 163.

After this, the product-sum operators 160 to 163 stop operations from time t0 to t6 (that is, while the pixel data of the operation target pixel in the first row is being set due to the shift). Furthermore, the product-sum operators 160 to 163 perform product-sum operations using the first row of the filter kernel 103 a in the horizontal direction (W00, W10, and W20) from time t7 to t9.

During that time, the filter operation control unit 106 instructs the image memory readout control unit 105 to read out, from the image memory 101, six operation target pixels, or D01, D11, and so on up to D51, in the horizontal direction, and supply those pixels to the shift register 112. Specifically, this process is carried out from time t6 to t11.

After this, the product-sum operators 160 to 163 stop operations from time t10 to t12 (that is, while the pixel data of the operation target pixel in the second row is being set due to the shift). Furthermore, the product-sum operators 160 to 163 perform product-sum operations using the second row of the filter kernel 103 a in the horizontal direction (W01, W11, and W21) from time t13 to t15.

During that time, the filter operation control unit 106 instructs the image memory readout control unit 105 to read out, from the image memory 101, six operation target pixels, or D02, D12, and so on up to D52, in the horizontal direction, and supply those pixels to the shift register 112. Specifically, this process is carried out from time t12 to t17.

After this, the product-sum operators 160 to 163 stop operations from time t16 to t18 (that is, while the pixel data of the operation target pixel in the third row is being set due to the shift). Furthermore, the product-sum operators 160 to 163 perform product-sum operations using the third row of the filter kernel 103a in the horizontal direction (W02, W12, and W22) from time t19 to t21.

At this point in time, a filter operation result R11, indicated by the following Formula (1), is outputted from the product-sum operator 160. Meanwhile, a filter operation result R21, indicated by the following Formula (2), is outputted from the product-sum operator 161. Additionally, a filter operation result R31, indicated by the following Formula (3), is outputted from the product-sum operator 162. Finally, a filter operation result R41, indicated by the following Formula (4), is outputted from the product-sum operator 163.

$$R11 = \sum_{i,j=-1,-1}^{1,1} D(1+i)(1+j) \times W(i+1)(j+1) \quad (1)$$

$$R21 = \sum_{i,j=-1,-1}^{1,1} D(2+i)(1+j) \times W(i+1)(j+1) \quad (2)$$

$$R31 = \sum_{i,j=-1,-1}^{1,1} D(3+i)(1+j) \times W(i+1)(j+1) \quad (3)$$

$$R41 = \sum_{i,j=-1,-1}^{1,1} D(4+i)(1+j) \times W(i+1)(j+1) \quad (4)$$

Then, from time t22, the following filter operation processes are performed. However, note that in the example shown in FIGS. 2A and 2B, the readout from the image memory 101 and the shift by the shift register 112 are carried out in advance through pipelining.

Next, operations performed when a sub-sampling filter operation process is carried out shall be described.

FIGS. 3A and 3B are time charts illustrating an example of operations performed when the image processing apparatus according to the first embodiment of the present invention carries out a sub-sampling filter operation process. Specifically, FIGS. 3A and 3B show examples of operations performed when a two-to-one sub-sampling filter operation process is carried out.

First, the filter operation control unit 106 outputs a control signal to the selectors 110 and 111 so that the outputs of the registers belonging to the second block (registers 124 and 126) are selected.

Next, the filter operation control unit 106 instructs the image memory readout control unit 105 to read out, from the image memory 101, nine operation target pixels, or D00, D10, and so on up to D80, in the horizontal direction, and supply those pixels to the shift register 112. Specifically, this process is carried out from time t0 to t8.

Then, the shift register 112 sequentially shifts the pixel data of the operation target pixels inputted from the image memory 101 and at the same time outputs the pixel data to the product-sum operators 160 to 163.

After this, the product-sum operators 160 to 163 stop operations from time t0 to t6 (that is, while the pixel data of the operation target pixel in the first row is being set due to the shift). Furthermore, the product-sum operators 160 to 163 perform product-sum operations using the first row of the filter kernel 103a in the horizontal direction (W00, W10, and W20) from time t7 to t9.

During that time, the filter operation control unit 106 instructs the image memory readout control unit 105 to read out, from the image memory 101, nine operation target pixels, or D01, D11, and so on up to D81, in the horizontal direction, and supply those pixels to the shift register 112. Specifically, this process is carried out from time t9 to t17.

After this, the product-sum operators 160 to 163 stop operations from time t10 to t15 (that is, while the operation target pixel data in the second row is being set due to the shift). Furthermore, the product-sum operators 160 to 163 perform product-sum operations using the second row of the filter kernel 103a in the horizontal direction (W01, W11, and W21) from time t16 to t18.

During that time, the filter operation control unit 106 instructs the image memory readout control unit 105 to read out, from the image memory 101, nine operation target pixels, or D02, D12, and so on up to D82, in the horizontal direction, and supply those pixels to the shift register 112. Specifically, this process is carried out from time t18 to t26.

After this, the product-sum operators 160 to 163 stop operations from time t19 to t24 (that is, while the operation target pixel data in the third row is being set due to the shift). Furthermore, the product-sum operators 160 to 163 perform product-sum operations using the third row of the filter kernel 103a in the horizontal direction (W02, W12, and W22) from time t25 to t27.

At this point in time, a filter operation result R11, indicated by the following Formula (5), is outputted from the product-sum operator 160. Meanwhile, a filter operation result R51, indicated by the following Formula (6), is outputted from the product-sum operator 161. Additionally, a filter operation result R31, indicated by the following Formula (7), is outputted from the product-sum operator 162. Finally, a filter operation result R71, indicated by the following Formula (8), is outputted from the product-sum operator 163.

$$R11 = \sum_{i,j=-1,-1}^{1,1} D(1+i)(1+j) \times W(i+1)(j+1) \quad (5)$$

$$R51 = \sum_{i,j=-1,-1}^{1,1} D(5+i)(1+j) \times W(i+1)(j+1) \quad (6)$$

$$R31 = \sum_{i,j=-1,-1}^{1,1} D(3+i)(1+j) \times W(i+1)(j+1) \quad (7)$$

$$R71 = \sum_{i,j=-1,-1}^{1,1} D(7+i)(1+j) \times W(i+1)(j+1) \quad (8)$$

Then, from time t28, the following filter operation processes are performed. However, note that in this case, the readout from the image memory 101 and the shift by the shift register 112 are carried out in advance through pipelining.

Next, a serial processing procedure carried out in an image processing method performed by the image processing apparatus 100 shall be described.

Figure 4:
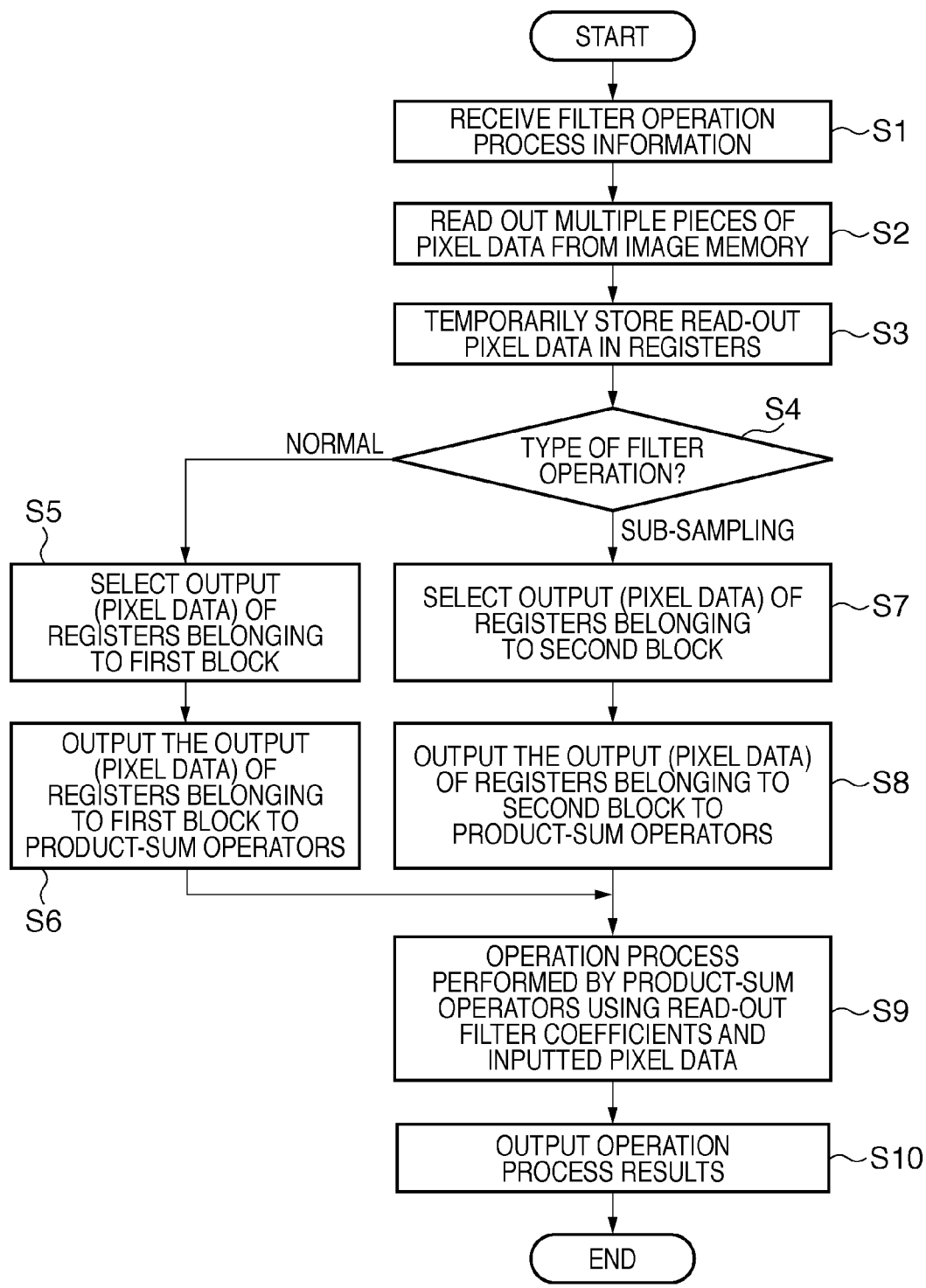
FIG. 4 is a flowchart illustrating an example of a processing procedure of the image processing apparatus according to the first embodiment of the present invention.

FIG. 4 is a flowchart illustrating an example of the processing procedure of the image processing apparatus according to the first embodiment of the present invention.

First, in Step S1, the filter operation control unit 106 receives filter operation process information provided according to the type of the filter operation process inputted by, for example, and external operation input unit. In the present embodiment, this filter operation process information is information provided according to a normal filter operation process (a filter operation process with a sub-sampling ratio of 1) or a two-to-one sub-sampling filter operation process (a filter operation process with a sub-sampling ratio of 2).

Then, in Step S2, the filter operation control unit 106 controls the image memory readout control unit 105 based on the filter operation process information received in Step S1 so that multiple pieces of pixel data are read out from the image memory 101. Through this, the image memory readout control unit 105 performs control for reading out predetermined multiple pieces of pixel data from the image memory 101 to the data supply unit 102.

Next, in Step S3, the data supply unit 102 temporarily stores the pixel data read out in Step S2 in the registers 120 to 126.

Then, in Step S4, the filter operation control unit 106 determines the type of the filter operation process based on the filter operation process information received in Step S1.

If the result of the determination of Step S4 shows that the type of the filter operation process is a normal filter operation process (a filter operation process with a sub-sampling ratio of 1), the procedure moves to Step S5. Upon moving to Step S5, the filter operation control unit 106 controls the selectors 110 and 111 so as to select the outputs (pixel data) of the registers belonging to the first block (in the present embodiment, registers 121 and 123). Through this, the selectors 110 and 111 select the outputs (pixel data) of the registers 121 and 123, respectively, that belong to the first block.

Following this, in Step S6, the data supply unit 102 outputs the outputs (pixel data) of the registers belonging to the first block (in the present embodiment, registers 120, 121, 122, and 123) to the product-sum operators 160 to 163. To be more specific, the data supply unit 102 outputs the outputs (pixel data) of the registers 120, 121, 122, and 123 belonging to the first block to the product-sum operators 160, 161, 162, and 163, respectively.

On the other hand, if the result of the determination of Step S4 shows that the type of the filter operation process is a two-to-one sub-sampling filter operation process (a filter operation process with a sub-sampling ratio of 2), the procedure moves to Step S7. Upon moving to Step S7, the filter operation control unit 106 controls the selectors 110 and 111 so as to select the outputs (pixel data) of the registers belonging to the second block (in the present embodiment, registers 124 and 126). Through this, the selectors 110 and 111 select the outputs (pixel data) of the registers 124 and 126, respectively, that belong to the second block.

Following this, in Step S8, the data supply unit 102 outputs the outputs (pixel data) of the registers belonging to the second block (in the present embodiment, registers 120, 122, 124, and 126) to the product-sum operators 160 to 163. To be more specific, the data supply unit 102 outputs the outputs (pixel data) of the registers 120, 122, 124, and 126 belonging to the second block to the product-sum operators 160, 161, 162, and 163, respectively.

When the processing in Step S6 or Step S8 ends, the procedure moves to Step S9. Upon moving to Step S9, first, the filter operation control unit 106 controls the filter coefficient memory readout control unit 104 so that filter coefficients in accordance with the type of filter operation process are read out from the filter coefficient memory 103. Through this, the filter coefficient memory readout control unit 104 performs control so that filter coefficients according to the type of the filter operation process are read out from the filter coefficient memory 103 to the product-sum operators 160 to 163. Next, the filter operation control unit 106 causes the product-sum operators 160 to 163 to perform operation processes using the read-out filter coefficients and the inputted pixel data.

Then, in Step S10, the product-sum operators 160 to 163 output the results of the operation processes performed in Step S9 to an external device.

After this, the processing of Steps S2 to S10 is repeated as necessary, thereby completing the serial process of the image processing method performed by the image processing apparatus 100.

As described thus far, the image processing apparatus 100 of the first embodiment controls the selections made by the selectors 110 and 111 using the filter operation control unit 106. This makes it possible to change the connection relationships between the product-sum operators 160 to 163 and the registers 120 to 126 within the data supply unit 102. Accordingly, with the first embodiment, wasteful operations are not performed by the product-sum operators 160 to 163, neither when performing a normal filter operation process nor when performing a two-to-one sub-sampling filter operation process.

Figure 8:
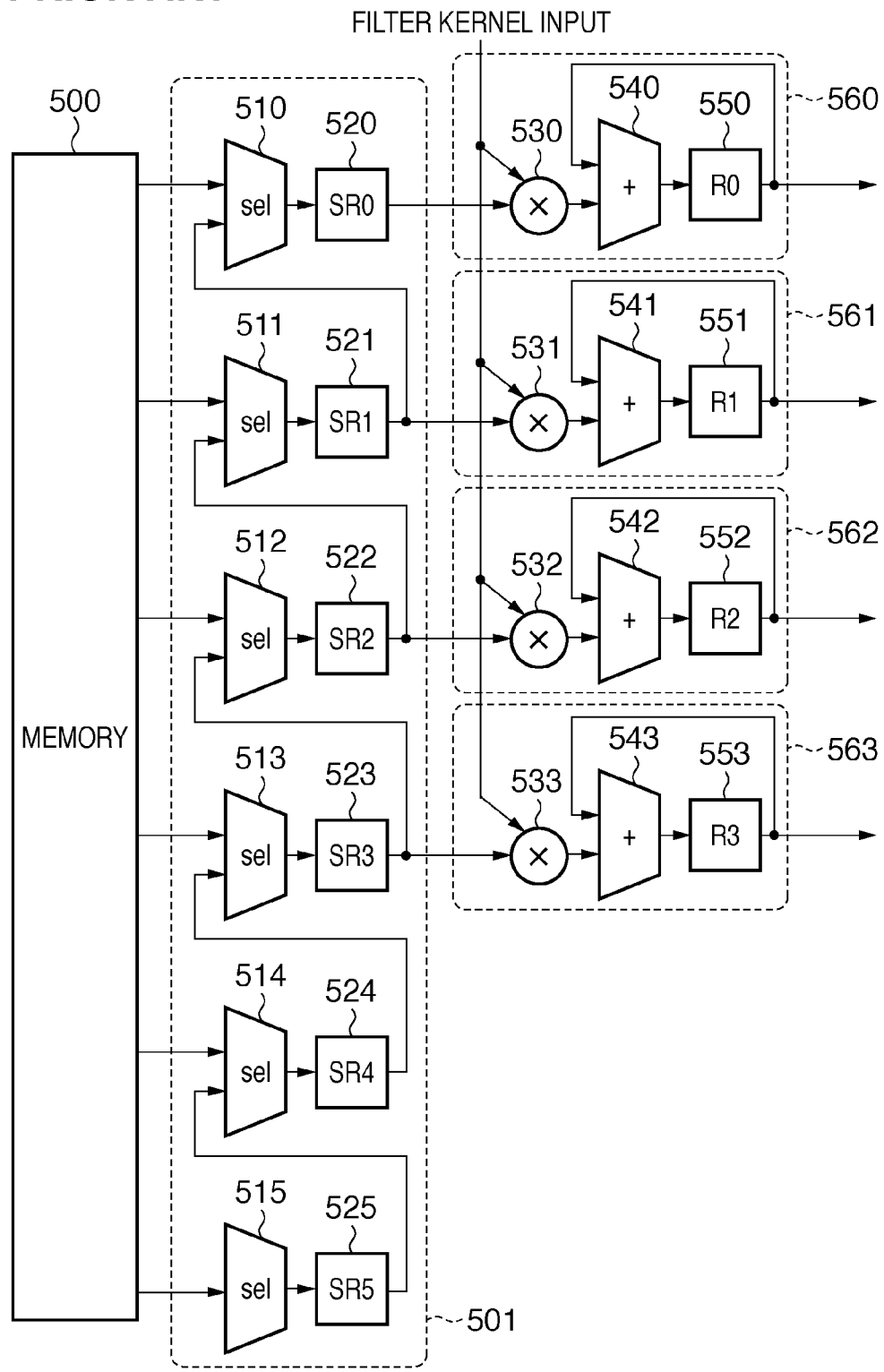
FIG. 8 is a block diagram illustrating an example of the configuration of an operation apparatus (image processing apparatus) that performs a two-dimensional filter operation on image data, as indicated in a conventional example.
Figure 9:
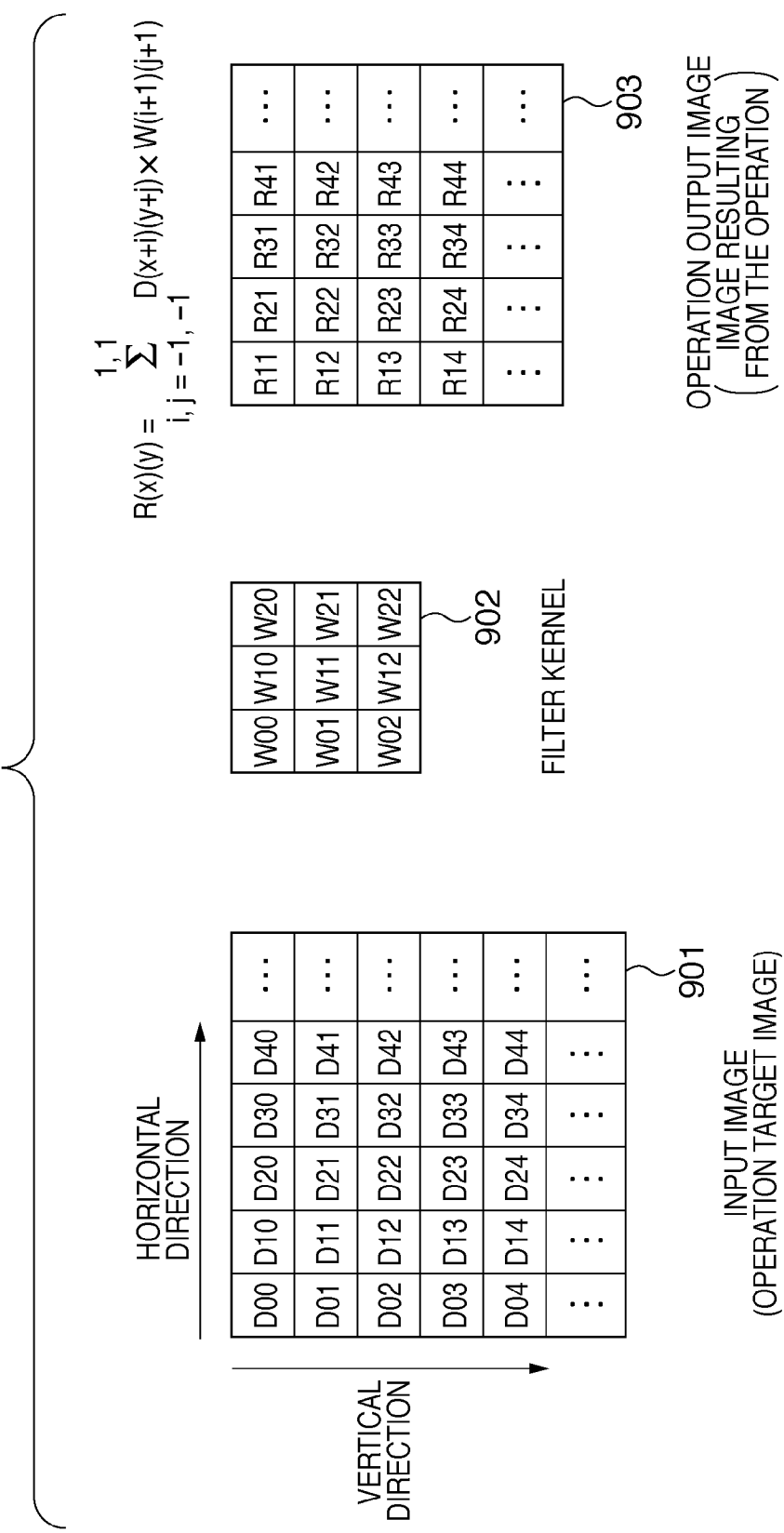
FIG. 9 is a schematic diagram illustrating an input image (operation target image), a filter kernel, and an operation output image (image resulting from the operation) in the case where filter operation processing is performed using the operation apparatus shown in FIG. 8.
Figure 10:
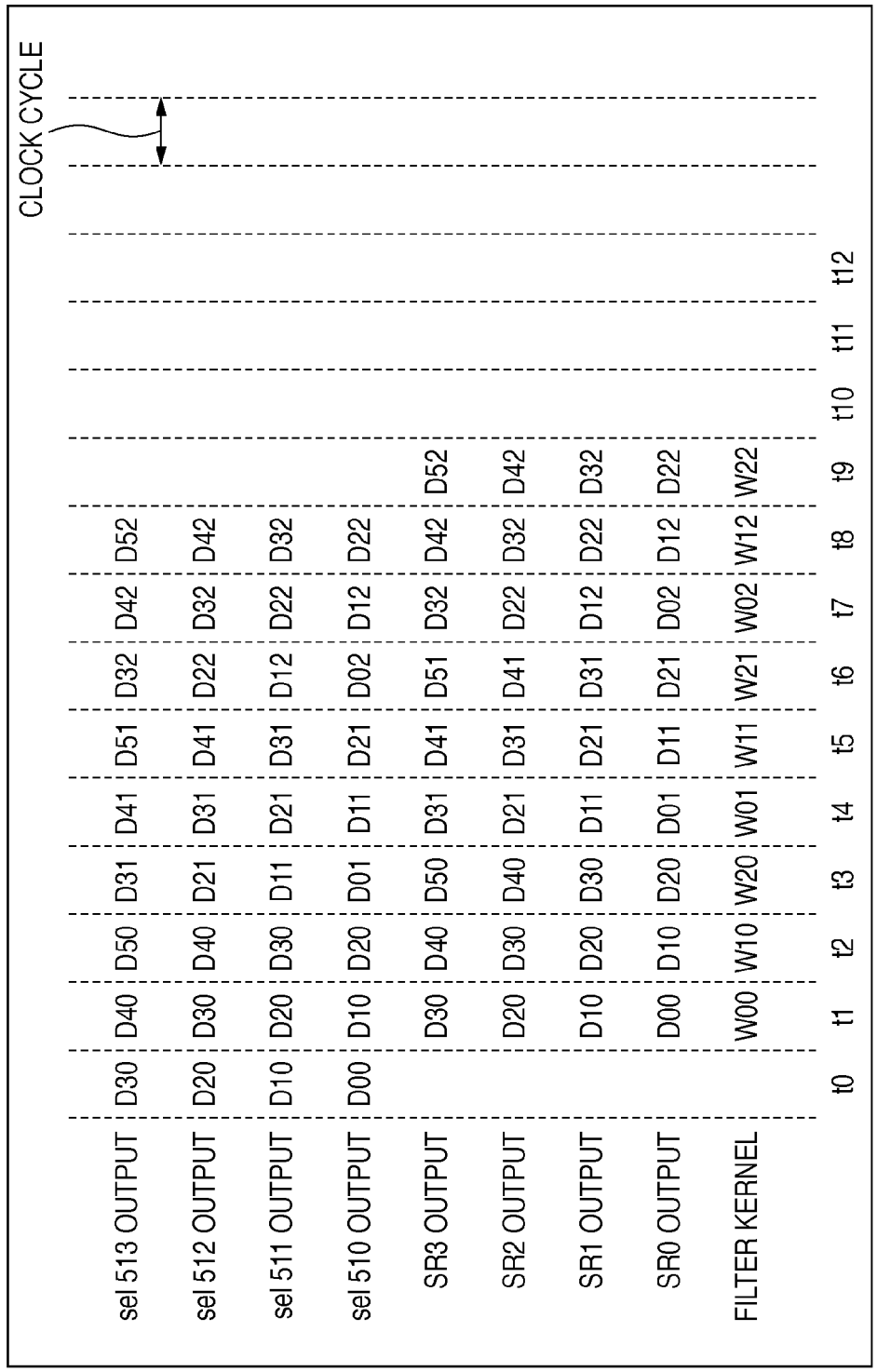
FIG. 10 is a time chart for when the operation apparatus of FIG. 8 is run using the images and so on illustrated in FIG. 9.

In other words, with the image processing apparatus 100 of the first embodiment, product-sum operators that were conventionally used in a wasteful manner when performing sub-sampling filter operation processes are exploited in a useful manner, resulting in a configuration that can effectively perform sub-sampling filter operation processes. Specifically, in the conventional example, operation units to which is supplied pixel data for computing decimated operation results (the product-sum operators 561 and 563 in FIG. 8) are present when sub-sampling filter operation processes are performed.

As opposed to this, in the first embodiment, selection units (the selectors 110 and 111) are provided between the operation units (product-sum operators 160 to 163) and the memory units (registers 120 to 126). Through this, it is possible to supply only the pixel data for computing an undecimated operation results (in other words, the necessary operation results) to the operation units. As a result, the operation units that compute decimated operation results are no longer present, making it possible to effectively perform sub-sampling filter operation processes.

It should be noted that although the present embodiment illustrates a case where four product-sum operators, equivalent to operation units, are provided and the filter operation process is performed with the filter kernel 103a being shifted one or two pixels relative to the pixel data of the operation target image and scanning the pixel data, the present invention is not limited thereto.

The following discusses a case where N product-sum operators, equivalent to operation units, are provided and the filter operation process is performed with the filter kernel 103a being shifted M pixels relative to the pixel data of the operation target image and scanning the pixel data.

In such a case, from the multiple registers provided, N registers present every M number of places from the first register at the time of sequential shifting are classified to a single block. At this time, the pixel data of the N registers present every M number of places from the first register is selected by the selectors and outputted to the product-sum operators.

(Second Embodiment)

A second embodiment of the present invention shall be described hereinafter.

The image processing apparatus 100 of the first embodiment is capable of performing both a normal filter operation process and a two-to-one sub-sampling filter operation process. However, the image processing apparatus 200 of the second embodiment is configured so as to be capable of performing a normal filter operation process, a two-to-one sub-sampling filter operation process, and a four-to-one sub-sampling filter operation process. In other words, according to the image processing apparatus 200 of the second embodiment, filter operation processes with sub-sampling ratios of 1, 2, and 4 can be performed.

The image processing apparatus 200 in the second embodiment has the same configuration as the image processing apparatus 100 illustrated in FIG. 1 and described in the first embodiment, with the exception of the data supply unit 102. Therefore, FIG. 5 illustrates a data supply unit 202 of the second embodiment, and the elements aside from this data supply unit 202 are identical to those in FIG. 1 and thus shall be omitted from the present descriptions.

Figure 5:
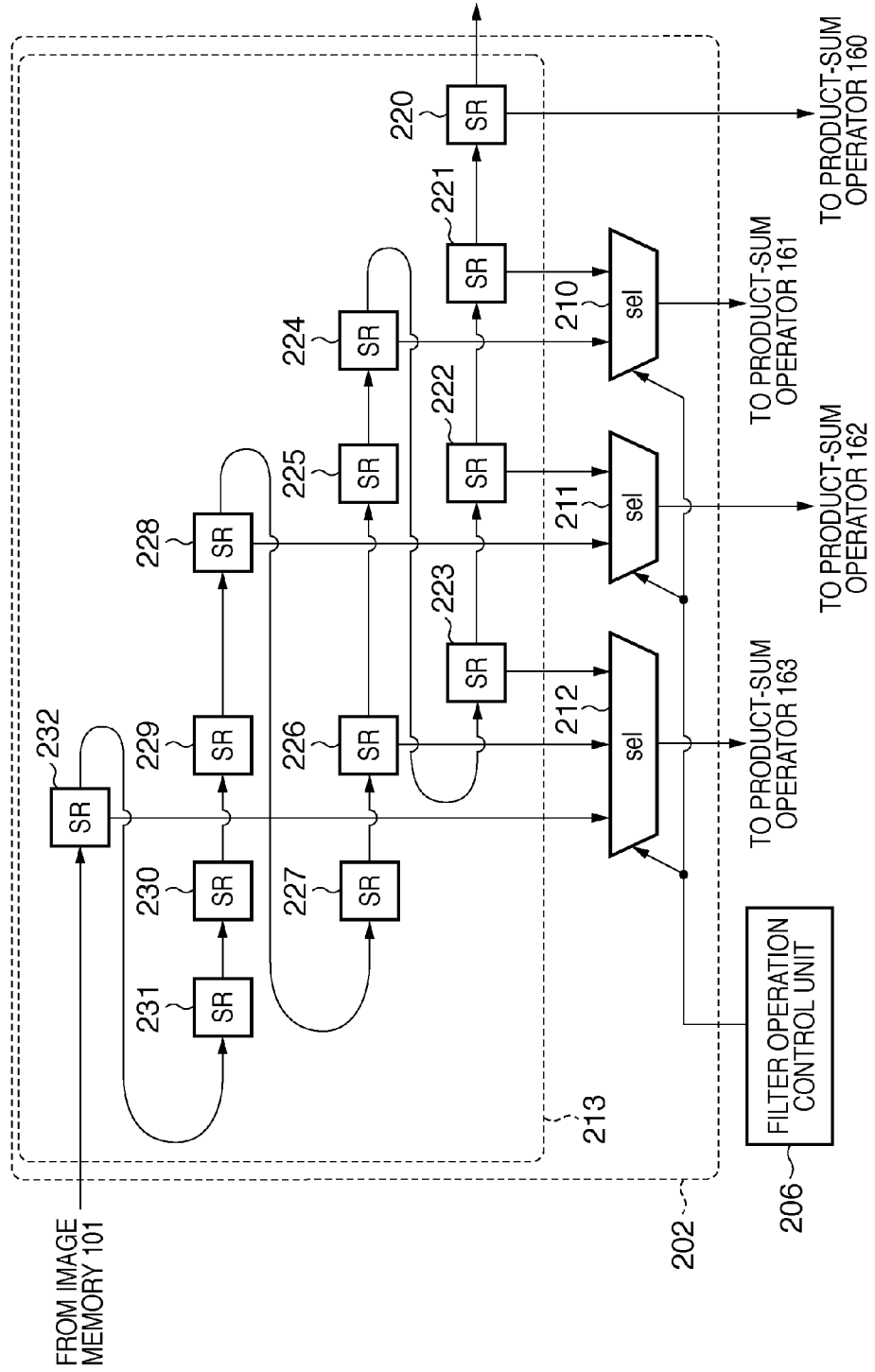
FIG. 5 is a block diagram illustrating an outline of an exemplary configuration of a data supply unit in an image processing apparatus according to a second embodiment of the present invention.

FIG. 5 is a block diagram illustrating an outline of an exemplary configuration of a data supply unit in an image processing apparatus according to a second embodiment of the present invention. Note that the filter operation control unit 206 shown in FIG. 5 is identical to the filter operation control unit 106 shown in FIG. 1 with the exception of the control signals it provides to the data supply unit 202.

In FIG. 5, the data supply unit 202 is configured so as to include a shift register 213 (configured of registers 220 to 232) capable of parallel output, and selectors 210, 211, and 212. The data supply unit 202 accumulates pixel data Dxy, inputted from the image memory 101, of an amount equal to the number of registers included (in the present embodiment, fifteen pixels' worth), and outputs these in parallel to the product-sum operators 160 to 163.

Here, the "classification of registers by blocks" described in the first embodiment is applied to the registers 220 to 232 illustrated in FIG. 5. In the present embodiment, there are three types of sub-sampling ratios, or 1, 2, and 4, and thus the number of blocks is also three (for the sake of simplicity, these shall be called a "first block", a "second block", and a "third block").

Table 3, below, shows the result of applying the "classification of registers by blocks" described in the first embodiment to the registers 220 to 232.

Furthermore, Table 4, below, shows the result of performing the "first association of registers and product-sum operators" described in the first embodiment on the registers 220 to 232 while furthermore excluding the registers 225 and 229, which are not classified into any block.

TABLE 4

|  | Product-sum Operator 160 | Product-sum Operator 161 | Product-sum Operator 162 | Product-sum Operator 163 |
|---|---|---|---|---|
| Association Results | Register 220 | Register 221 Register 224 | Register 222 Register 228 | Register 223 Register 226 Register 232 |

The forms of connection of the outputs of the registers 220 to 232 are determined as shown below based on Table 4 (see FIG. 5).

1. If there is only a single register that corresponds to a product-sum operator, the output of that register is connected directly to that corresponding product-sum operator (i.e. the register 220).

2. If there are multiple registers corresponding to a product-sum operator, the outputs of those registers are connected to the product-sum operator via selectors (registers 221, 224, 222, 228, 223, 226, and 232).

Based on these rules, the forms of connection between the registers 220 to 232 and the product-sum operators 160 to 163 are determined (see FIG. 5). To be more specific, the output of the register 221 belonging to the first block and the output of the register 224 belonging to the second and third blocks are inputted into the selector 210 and the output selected by the selector 210 is inputted into the product-sum operator 161. Meanwhile, the output of the register 222 belonging to the first and second blocks and the output of the register 228 belonging to the third block are inputted into the selector 211 and the output selected by the selector 211 is inputted into the product-sum operator 162. Furthermore, the output of the register 223 belonging to the first block, the output of the register 226 belonging to the second block, and the output of the register 232 belonging to the third block are inputted into the selector 212 and the output selected by the selector 212 is inputted into the product-sum operator 163.

The filter operation control unit 206 outputs control signals to the filter coefficient memory readout control unit 104, the

TABLE 3

|  | Register 220 | Register 221 | Register 222 | Register 223 | Register 224 | Register 225 | Register 226 |
|---|---|---|---|---|---|---|---|
| Classification Results | Belongs to first, second, and third blocks | Belongs to first block | Belongs to first and second blocks | Belongs to first block | Belongs to second and third blocks | — | Belongs to second block |

|  | Register 227 | Register 228 | Register 229 | Register 230 | Register 231 | Register 232 |
|---|---|---|---|---|---|---|
| Classification Results | — | Belongs to third block | — | — | — | Belongs to third block | image memory readout control unit 105, and the product-sum operators 160 to 163 shown in FIG. 1, as well as to the selectors 210 to 212 shown in FIG. 5. The filter operation control unit 206 performs overall control over the processing involved with filter operation in the image processing apparatus 200 according to the second embodiment. To be more specific, the following control is performed.

First, the filter operation control unit 206 outputs control signals as described below to the selectors 210, 211, and 212.

1. In the case where a normal filter operation (a filter operation with a sub-sampling ratio of 1) is carried out, a control signal is outputted so that the outputs of the registers belonging to the first block (registers 221, 222, and 223) are selected as the outputs of the selectors 210 to 212.

b 2. In the case where a two-to-one sub-sampling filter operation (a filter operation with a sub-sampling ratio of 2) is carried out, a control signal is outputted so that the outputs of the registers belonging to the second block (registers 224, 222, and 226) are selected as the outputs of the selectors 210 to 212.

3. In the case where a four-to-one sub-sampling filter operation (a filter operation with a sub-sampling ratio of 4) is carried out, a control signal is outputted so that the outputs of the registers belonging to the third block (registers 224, 228, and 232) are selected as the outputs of the selectors 210 to 212.

The filter operation control unit 206 also outputs control signals as described below to the image memory readout control unit 105.

1. In the case where a normal filter operation (a filter operation with a sub-sampling ratio of 1) is carried out, a control signal for reading out a number of operation target pixels equivalent to "concurrency level+horizontal size of filter kernel−1" from the image memory 101 in the horizontal direction and once again reading out a number of operation target pixels equivalent to "concurrency level+horizontal size of filter kernel−1" from the next row, and repeating these readouts a number of times equivalent to the size of the vertical direction of the filter kernel, is outputted to the image memory readout control unit 105. In the present embodiment, 6, or 4+3−1, operation target pixels in the horizontal direction are read out, and the readout is repeated three times.

2. In the case where a two-to-one filter operation (a filter operation with a sub-sampling ratio of 2) is carried out, a control signal for reading out a number of operation target pixels equivalent to "2×concurrency level+horizontal size of filter kernel−2" from the image memory 101 in the horizontal direction and once again reading out a number of operation target pixels equivalent to "2×concurrency level+horizontal size of filter kernel−2" from the next row, and repeating these readouts a number of times equivalent to the size of the vertical direction of the filter kernel, is outputted to the image memory readout control unit 105. In the present embodiment, 9, or 2×4+3−2, operation target pixels in the horizontal direction are read out, and the readout is repeated three times.

3. In the case where a four-to-one sub-sampling filter operation (a filter operation with a sub-sampling ratio of 4) is carried out, a control signal for reading out a number of operation target pixels equivalent to "4×concurrency level+ horizontal size of filter kernel−4" from the image memory 101 in the horizontal direction and once again reading out a number of operation target pixels equivalent to "4×concurrency level+horizontal size of filter kernel−4" from the next row, and repeating these readouts a number of times equivalent to the size of the vertical direction of the filter kernel, is outputted to the image memory readout control unit 105. In the present embodiment, 15, or 4×4+3−4, operation target pixels in the horizontal direction are read out, and the readout is repeated three times.

Furthermore, the filter operation control unit 206 instructs the filter coefficient memory 103 of the readout timing via the filter coefficient memory readout control unit 104, and instructs the product-sum operators 160 to 163 of the product-sum operation timing.

Next, a serial processing procedure carried out in an image processing method performed by the image processing apparatus 200 shall be described.

Figure 6A:
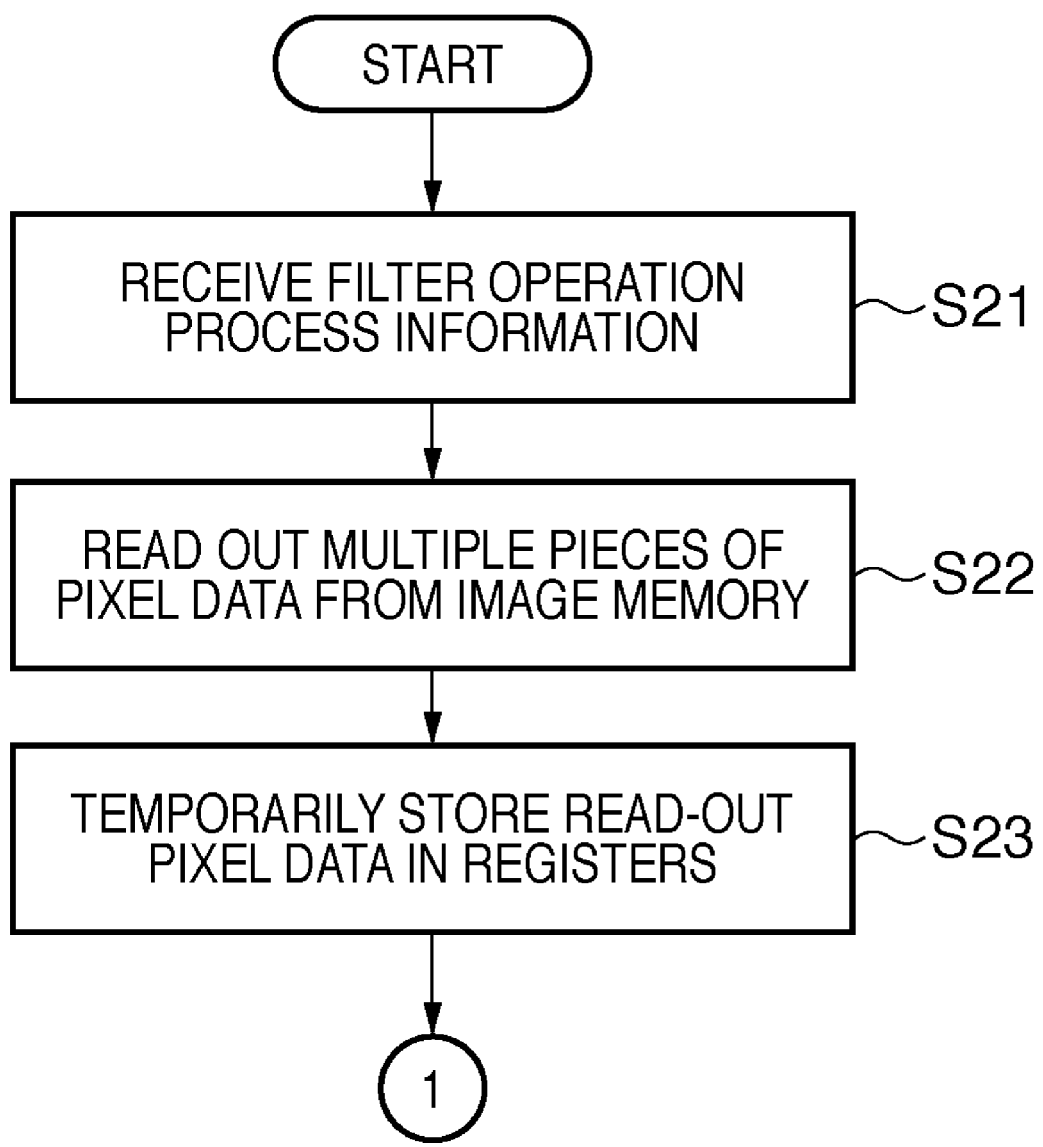

FIGS. 6A and 6B are flowcharts illustrating an example of a processing procedure of the image processing apparatus according to the second embodiment of the present invention.

First, in Step S21, the filter operation control unit 206 receives filter operation process information provided according to the type of the filter operation process inputted by, for example, and external operation input unit. In the present embodiment, this filter operation process information is information provided according to a normal filter operation process, a two-to-one sub-sampling filter operation process, or a four-to-one sub-sampling filter operation process.

Then, in Step S22, the filter operation control unit 206 controls the image memory readout control unit 105 based on the filter operation process information received in Step S21 so that multiple pieces of pixel data are read out from the image memory 101. Through this, the image memory readout control unit 105 performs control for reading out predetermined multiple pieces of pixel data from the image memory 101 to the data supply unit 202.

Next, in Step S23, the data supply unit 202 temporarily stores the pixel data read out in Step S22 in the registers 220 to 232.

Then, in Step S24, the filter operation control unit 206 determines the type of the filter operation process based on the filter operation process information received in Step S21.

If the result of the determination of Step S24 shows that the type of the filter operation process is a normal filter operation process (a filter operation process with a sub-sampling ratio of 1), the procedure moves to Step S25. Upon moving to Step S25, the filter operation control unit 206 controls the selectors 210 to 212 so as to select the outputs (pixel data) of the registers belonging to the first block (in the present embodiment, registers 221 to 223). Through this, the selectors 210 to 212 select the outputs (pixel data) of the registers 221 to 223, respectively, that belong to the first block.

Following this, in Step S26, the data supply unit 202 outputs the outputs (pixel data) of the registers belonging to the first block (in the present embodiment, registers 220 to 223) to the product-sum operators 160 to 163. To be more specific, the data supply unit 202 outputs the outputs (pixel data) of the registers 220, 221, 222, and 223 belonging to the first block to the product-sum operators 160, 161, 162, and 163, respectively.

Meanwhile, if the result of the determination of Step S24 shows that the type of the filter operation process is a two-to-one sub-sampling filter operation process (a filter operation process with a sub-sampling ratio of 2), the procedure moves to Step S27. Upon moving to Step S27, the filter operation control unit 206 controls the selectors 210 to 212 so as to select the outputs (pixel data) of the registers belonging to the second block (in the present embodiment, registers 224, 222, and 226). Through this, the selectors 210 to 212 select the outputs (pixel data) of the registers 224, 222, and 226, respectively, that belong to the second block.

Following this, in Step S28, the data supply unit 202 outputs the outputs (pixel data) of the registers belonging to the second block (in the present embodiment, registers 220, 224, 222, and 226) to the product-sum operators 160 to 163. To be more specific, the data supply unit 202 outputs the outputs (pixel data) of the registers 220, 224, 222, and 226 belonging to the second block to the product-sum operators 160, 161, 162, and 163, respectively.

Finally, if the result of the determination of Step S24 shows that the type of the filter operation process is a four-to-one sub-sampling filter operation process (a filter operation process with a sub-sampling ratio of 4), the procedure moves to Step S29. Upon moving to Step S29, the filter operation control unit 206 controls the selectors 210 to 212 so as to select the outputs (pixel data) of the registers belonging to the third block (in the present embodiment, registers 224, 228, and 232). Through this, the selectors 210 to 212 select the outputs (pixel data) of the registers 224, 228, and 232, respectively, that belong to the third block.

Following this, in Step S30, the data supply unit 202 outputs the outputs (pixel data) of the registers belonging to the third block (in the present embodiment, registers 220, 224, 228, and 232) to the product-sum operators 160 to 163. To be more specific, the data supply unit 202 outputs the outputs (pixel data) of the registers 220, 224, 228, and 232 belonging to the third block to the product-sum operators 160, 161, 162, and 163, respectively.

When the processing in Step S26, Step S28, or Step S30 ends, the procedure moves to Step S31. Upon moving to Step S31, first, the filter operation control unit 206 controls the filter coefficient memory readout control unit 104 so that filter coefficients in accordance with the type of filter operation process are read out from the filter coefficient memory 103. Through this, the filter coefficient memory readout control unit 104 performs control so that filter coefficients according to the type of the filter operation process are read out from the filter coefficient memory 103 to the product-sum operators 160 to 163. Next, the filter operation control unit 206 causes the product-sum operators 160 to 163 to perform operation processes using the read-out filter coefficients and the inputted pixel data.

Then, in Step S32, the product-sum operators 160 to 163 output the results of the operation processes performed in Step S31 to an external device.

After this, the processing of Steps S22 to S32 is repeated as necessary, thereby completing the serial process of the image processing method performed by the image processing apparatus 200.

As described thus far, the image processing apparatus 200 of the second embodiment controls the selections made by the selectors 210 to 212 using the filter operation control unit 206. Accordingly, with the second embodiment, a normal filter operation process, a two-to-one sub-sampling filter operation process, and a four-to-one sub-sampling filter operation process can all be performed using the same circuit, and wasteful operations are not performed by the product-sum operators 160 to 163.

(Third Embodiment)

A third embodiment of the present invention shall be described hereinafter.

With the image processing apparatus 100 of the first embodiment, the output order of the filter operation results from the product-sum operators 160 to 163 changes (is different) between a normal filter operation process and a sub-sampling filter operation process. Specifically, in the case of a normal filter operation process, filter operation results are outputted from the respective product-sum operators 160, 161, 162, and 163 in the order R11, R21, R31, and R41. On the other hand, in the case of a two-to-one sub-sampling filter operation process, filter operation results are outputted from the respective product-sum operators 160, 161, 162, and 163 in the order R11, R51, R31, and R71.

In the third embodiment, the output order of the filter operation results from the product-sum operators does not change (that is, is the same) when carrying out a normal filter operation process and a two-to-one sub-sampling filter operation process. Accordingly, description shall be provided regarding a combination of choices made by selectors and processing performed when determining to which product-sum operator the selection results are to be inputted.

The image processing apparatus 300 in the third embodiment has the same configuration as the image processing apparatus 100 illustrated in FIG. 1 and described in the first embodiment, with the exception of the data supply unit 302. Therefore, FIG. 7 illustrates a data supply unit 302 of the third embodiment, and the elements aside from this data supply unit 302 are identical to those in FIG. 1 and thus shall be omitted from the present descriptions.

Figure 7:
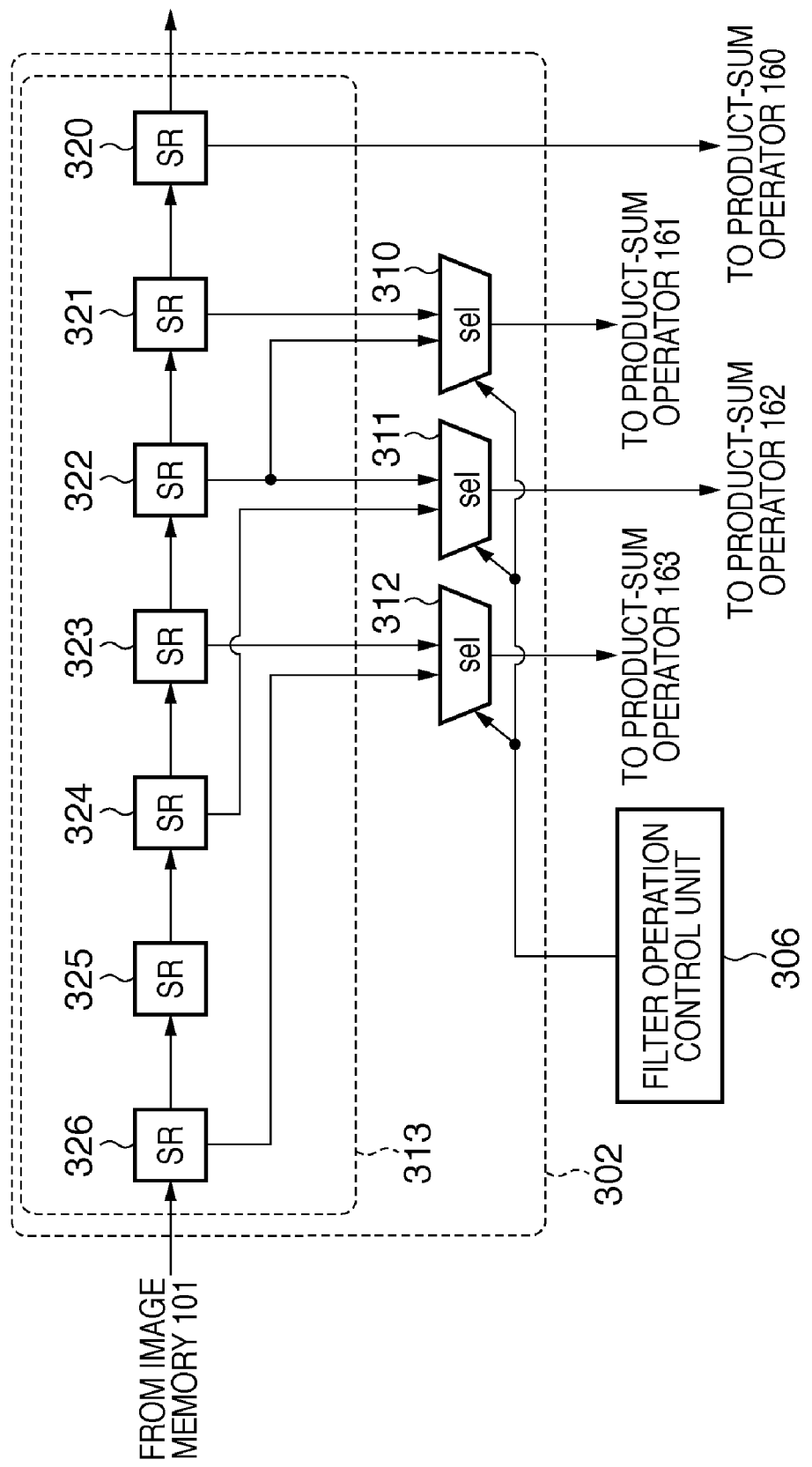
FIG. 7 is a block diagram illustrating an outline of an exemplary configuration of a data supply unit in an image processing apparatus according to a third embodiment of the present invention.

FIG. 7 is a block diagram illustrating an outline of an exemplary configuration of the data supply unit in the image processing apparatus according to the third embodiment of the present invention. Note that the filter operation control unit 306 shown in FIG. 7 is identical to the filter operation control unit 106 shown in FIG. 1 with the exception of the control signals it provides to the data supply unit 302.

In FIG. 7, the data supply unit 302 is configured so as to include a shift register 313 (configured of registers 320 to 326) capable of parallel output, and selectors 310, 311, and 312. The data supply unit 302 accumulates pixel data Dxy, inputted from the image memory 101, of an amount equal to the number of registers included (in the present embodiment, seven pixels' worth), and outputs these in parallel to the product-sum operators 160 to 163.

Here, the "classification of registers by blocks" described in the first embodiment is applied to the registers 320 to 326 illustrated in FIG. 7. In the present embodiment, there are two types of sub-sampling ratios, or 1 and 2, and thus the number of blocks is also 2 (for the sake of simplicity, these shall be called a "first block" and a "second block"), as in the first embodiment.

Table 5, below, shows the result of applying the "classification of registers by blocks" described in the first embodiment to the registers 320 to 326 (Table 5 therefore has the same basic form as Table 1).

TABLE 5

|  | Register 320 | Register 321 | Register 322 | Register 323 | Register 324 | Register 325 | Register 326 |
| --- | --- | --- | --- | --- | --- | --- | --- |
| Classification Results | Belongs to first and second blocks | Belongs to first block | Belongs to first and second blocks | Belongs to first block | Belongs to second block | — | Belongs to second block |

In the third embodiment, the output order of the filter operation results from the product-sum operators 160 to 163 not changing between a normal filter operation process and a sub-sampling filter operation process is given priority, and thus the associations indicated below are carried out. To be more specific, association with one of the product-sum operators 160 to 163 or with another product-sum operator is carried out in accordance with the "second association of registers and product-sum operators" described below.

(Second Association of Registers and Product-Sum Operators)

The first registers in the shift register 313 of a number equal to the concurrency level (4, in the present embodiment) belonging to the first block are associated, in order (320, 321, 322, and 323), with the product-sum operators in order (160, 161, 162, and 163).

Meanwhile, the first registers in the shift register 313 of a number equal to the concurrency level (4, in the present embodiment) belonging to the second block are associated, in order (320, 322, 324, and 326), with the product-sum operators in order (160, 161, 162, and 163).

Table 6, below, shows the result of performing the "second association of registers and product-sum operators" on the registers 320 to 326 while furthermore excluding the register 325, which is not classified into any block.

TABLE 6

|  | Product-sum Operator 160 | Product-sum Operator 161 | Product-sum Operator 162 | Product-sum Operator 163 |
|---|---|---|---|---|
| Association Results | Register 320 | Register 321 | Register 322 | Register 323 |
|  |  | Register 322 | Register 324 | Register 326 |

The forms of connection of the outputs of the registers 320 to 326 are determined as shown below based on Table 6.

1. If there is only a single register that corresponds to a product-sum operator, the output of that register is connected directly to that corresponding product-sum operator (i.e. the register 320).

2. If there are multiple registers corresponding to a product-sum operator, the outputs of those registers are connected to the corresponding product-sum operator via selectors (registers 321, 322, 324, 323, and 326).

Based on these rules, the forms of connection between the registers 320 to 326 and the product-sum operators 160 to 163 are determined (see FIG. 7). To be more specific, the output of the register 321 belonging to the first block and the output of the register 322 belonging to the second block are inputted into the selector 310 and the output selected by the selector 310 is inputted into the product-sum operator 161. Furthermore, the output of the register 322 belonging to the first block and the output of the register 324 belonging to the second block are inputted into the selector 311 and the output selected by the selector 311 is inputted into the product-sum operator 162. Finally, the output of the register 323 belonging to the first block and the output of the register 326 belonging to the second block are inputted into the selector 312 and the output selected by the selector 312 is inputted into the product-sum operator 163.

The filter operation control unit 306 outputs control signals as described below to the selectors 310, 311, and 312.

1. In the case where a normal filter operation (a filter operation with a sub-sampling ratio of 1) is carried out, a control signal is outputted so that the outputs of the registers belonging to the first block (registers 321, 322, and 323) are selected as the outputs of the selectors 310 to 312.

2. In the case where a two-to-one sub-sampling filter operation (a filter operation with a sub-sampling ratio of 2) is carried out, a control signal is outputted so that the outputs of the registers belonging to the second block (registers 322, 324, and 326) are selected as the outputs of the selectors 310 to 312.

When a normal filter operation is performed in the present embodiment, a filter operation result R11 is outputted from the product-sum operator 160, as in the first embodiment. Similarly, a filter operation result R21 is outputted from the product-sum operator 161, a filter operation result R31 is outputted from the product-sum operator 162, and a filter operation result R41 is outputted from the product-sum operator 163.

Meanwhile, when a sub-sampling filter operation is performed, first, a filter operation result R11 is outputted from the product-sum operator 160. Furthermore, a filter operation result R31 is outputted from the product-sum operator 161, a filter operation result R51 is outputted from the product-sum operator 162, and a filter operation result R71 is outputted from the product-sum operator 163.

Note that the serial processing procedure of an image processing method performed by the image processing apparatus 300 of the third embodiment is the same as the serial processing procedure of the image processing method performed by the image processing apparatus 100 of the first embodiment shown in FIG. 4.

As described in detail thus far, according to the image processing apparatus 300 of the third embodiment, the output order of the filter operation results from the product-sum operator does not change (is the same) between a normal filter operation process and a sub-sampling filter operation process. Accordingly, the third embodiment has an advantage in that control of the stages following the product-sum operator is easy to handle, in addition to the effects of the first embodiment.

The aforementioned constituent elements shown in FIGS. 1, 5, and 7 that make up the image processing apparatuses and the steps shown in FIGS. 4 and 6 that make up the image processing methods according to the respective embodiments can be implemented by operating a program stored in a RAM, ROM, or the like of a computer. Such a program, and a computer-readable storage medium in which is stored that program, also fall within the scope of the present invention.

Specifically, the program is supplied to a computer by being recorded on a storage medium such as, for example, a CD-ROM, or via one of a variety of transmission media. A flexible disk, a hard disk, an optical disk, magnetic tape, a magneto-optical disk, a non-volatile memory card, and the like are examples of other storage media, aside from a CD-ROM, in which the program can be stored. On the other hand, a communication medium used in a computer network (a LAN, WAN on, for example, the Internet, a wireless communication network, and so on) for supplying the program information by transporting it via transport waves can be given as an example of a transmission medium for the program. A hard-wired line such as a fiber-optic line, a wireless line, and so on can be given as examples of the communication medium used here.

Furthermore, the present invention is not limited to a form in which the functions of the image processing apparatuses according to the embodiments are realized by executing a program supplied to a computer. The program also falls within the scope of the present invention even in the case where the program realizes the functions of the image processing apparatuses according to the embodiments by running cooperatively with an OS(operating system), another software application, or the like running on the computer. Furthermore, the program also falls within the scope of the present invention even in the case where the functions of the image processing apparatuses according to the embodiments are realized by all or part of the processing performed by the supplied program being executed by a function expansion board or function expansion unit of the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-259060, filed Oct. 2, 2007, which is hereby incorporated by reference herein in its entirety.

What is claimed is:

1. An image processing apparatus that performs a filter operation process on pixel data of an image stored in an image memory by scanning the pixel data using a filter kernel, the apparatus comprising:
a receiving unit that receives a type of filter operation process to be performed;
a plurality of memory units which are classified into a plurality of blocks according to types of the filter operation processes;
a data supply unit that reads out a plurality of pieces of pixel data from the image memory and temporarily stores the pixel data in the plurality of memory units, and outputs the stored plurality of pieces of pixel data while sequentially shifting the pixel data;
a plurality of operation units that concurrently perform filter operation processes based on filter coefficients in the filter kernel and the plurality of pieces of pixel data outputted from the data supply unit; and
a selection unit that selects one of the plurality of memory units for at least one specific operation unit in the plurality of operation units, which belongs to a block corresponding to a type of the filter operation process received by said receiving unit, and outputs the pixel data stored in the selected memory unit to the specific operation unit, wherein in the case where N number of the operation units, where N is a positive integer, are provided and the filter operation process is performed by scanning the pixel data of the image with the filter kernel being shifted M pixels relative to the pixel data, where M is a positive integer, from the multiple memory units, the N number of memory units equal to the number N of operation units present every M number of places equal to the number M of pixels from a first memory unit at the time of the sequential shifting are classified to a single block.

2. The image processing apparatus according to claim 1, wherein the filter operation process is classified according to the number of pixels the filter kernel is shifted relative to the pixel data of the image during scanning.

3. The image processing apparatus according to claim 1, wherein in the case where the filter operation process is performed by scanning the pixel data of the image with the filter kernel being shifted M pixels relative to the pixel data, the pixel data in the N number of memory units present every M number of places from the first memory unit is selected by the selection unit and outputted to the operation units.

4. An image processing method that performs a filter operation process on pixel data of an image stored in an image memory by scanning the pixel data using a filter kernel, the method comprising:
a receiving step of receiving a type of filter operation process to be performed;
a data supply step of reading out a plurality of pieces of pixel data from the image memory and temporarily storing the pixel data in a plurality of memory units, which are classified into a plurality of blocks according to types of the filter operation processes, and outputting the stored plurality of pieces of pixel data while sequentially shifting the pixel data; and
an operation step of concurrently performing filter operation processes based on filter coefficients in the filter kernel and a plurality of pieces of pixel data outputted in the data supply step using a plurality of operation units,
wherein the data supply step includes a selection step of selecting one of the plurality of memory units for at least one specific operation unit in the plurality of operation units, which belongs to a block corresponding to a type of the filter operation process received in said receiving step and outputs the pixel data stored in the selected memory unit to the specific operation unit, wherein in the case where N number of the operation units, where N is a positive integer, are provided and the filter operation process is performed by scanning the pixel data of the image with the filter kernel being shifted M pixels relative to the pixel data, where M is a positive integer, from the multiple memory units, the N number of memory units equal to the number N of operation units present every M number of places equal to the number M of pixels from a first memory unit at the time of the sequential shifting are classified to a single block.

5. The image processing method according to claim 4, wherein the filter operation process is classified according to the number of pixels the filter kernel is shifted relative to the pixel data of the image during scanning.

6. The image processing method according to claim 4, wherein in the case where the filter operation process is performed by scanning the pixel data of the image with the filter kernel being shifted M pixels relative to the pixel data, the pixel data in the N number of memory units present every M number of places from the first memory unit is selected in the selection step and outputted to the operation units.

7. A non-transitory computer-readable storage medium storing a computer program for causing a computer to execute an image processing method that performs a filter operation process on pixel data of an image stored in an image memory by scanning the pixel data using a filter kernel, the computer program causing a computer to execute:
a receiving step of receiving a type of filter operation process to be performed;
a data supply step of reading out a plurality of pieces of pixel data from the image memory and temporarily storing the pixel data in a plurality of memory units, which are classified into a plurality of blocks according to types of the filter operation processes, and outputting the stored plurality of pieces of pixel data while sequentially shifting the pixel data; and
an operation step of concurrently performing filter operation processes based on filter coefficients in the filter kernel and a plurality of pieces of pixel data outputted in the data supply step using a plurality of operation units,
wherein the data supply step includes a selection step of selecting one of the plurality of memory units for at least one specific operation unit in the plurality of operation units, which belongs to a block corresponding a type of the filter operation process received in said receiving step, and outputs the pixel data stored in the selected memory unit to the specific operation unit, wherein in the case where N number of the operation units, where N is a positive integer, are provided and the filter operation process is performed by scanning the pixel data of the image with the filter kernel being shifted M pixels relative to the pixel data, where M is a positive integer, from the multiple memory units, the N number of memory units equal to the number N of operation units present every M number of places equal to the number M of pixels from a first memory unit at the time of the sequential shifting are classified to a single block.

* * * * *